(12) United States Patent
Buehler et al.

(10) Patent No.: US 6,665,000 B1
(45) Date of Patent: Dec. 16, 2003

(54) REMOTE SITE INTERACTIVE SYSTEM

(75) Inventors: William S. Buehler, Zeeland, MI (US); Harry G. Derks, Holland, MI (US)

(73) Assignee: Fleetwood Group, Inc., Holland, MI (US)

( * ) Notice: Subject to any disclaimer, the term of this patent is extended or adjusted under 35 U.S.C. 154(b) by 0 days.

(21) Appl. No.: 09/192,256

(22) Filed: Nov. 13, 1998

(51) Int. Cl.[7] .................................................. H04N 7/14
(52) U.S. Cl. ............................. 348/14.08; 348/14.02; 348/14.05
(58) Field of Search ........................ 348/14.01–14.09, 348/14.1, 14.11–14.13, 14.16; 379/202.01; 370/260; 345/753; 434/350, 336

(56) References Cited

U.S. PATENT DOCUMENTS

| 3,623,242 | A |   | 11/1971 | Hoover |
| 3,803,491 | A |   | 4/1974  | Osborn |
| 3,810,316 | A |   | 5/1974  | Lahlou |
| 4,048,729 | A |   | 9/1977  | Derks |
| 4,052,798 | A |   | 10/1977 | Tomita et al. |
| 4,057,805 | A |   | 11/1977 | Dowling |
| 4,238,893 | A |   | 12/1980 | Komatsubara et al. |
| 4,347,604 | A |   | 8/1982  | Saito et al. |
| 4,365,249 | A |   | 12/1982 | Tabata |
| 4,377,870 | A |   | 3/1983  | Anderson et al. |
| 4,493,655 | A |   | 1/1985  | Groff |
| 4,584,602 | A |   | 4/1986  | Nakagawa |
| 4,639,914 | A |   | 1/1987  | Winters |
| 4,663,499 | A |   | 5/1987  | Duval |
| 4,691,202 | A |   | 9/1987  | Denne et al. |
| 4,817,115 | A |   | 3/1989  | Campo et al. |
| 4,921,464 | A |   | 5/1990  | Ito et al. |
| 4,926,375 | A |   | 5/1990  | Mercer et al. |
| 4,928,099 | A |   | 5/1990  | Drake |
| 4,937,856 | A | * | 6/1990  | Natarajan ............... 379/202.01 |
| 5,001,755 | A |   | 3/1991  | Skret |
| 5,226,177 | A |   | 7/1993  | Nickerson |
| 5,273,437 | A |   | 12/1993 | Calwell et al. |
| 5,297,144 | A |   | 3/1994  | Gilbert et al. |
| 5,303,042 | A |   | 4/1994  | Lewis et al. |
| 5,329,620 | A |   | 7/1994  | Alford et al. |
| 5,357,609 | A |   | 10/1994 | Sellers et al. |
| 5,473,367 | A | * | 12/1995 | Bales et al. ............... 348/14.11 |
| RE35,449  | E |   | 2/1997  | Derks |
| 5,629,868 | A |   | 5/1997  | Tessier et al. |
| 5,694,334 | A |   | 12/1997 | Donahue et al. |
| 5,724,357 | A |   | 3/1998  | Derks |
| 5,727,950 | A |   | 3/1998  | Cook et al. |
| 6,501,740 | B1 | * | 12/2002 | Sun et al. ............... 379/202.01 |

FOREIGN PATENT DOCUMENTS

| CA | 2108935    |   | 4/1994  |              |
| EP | 0556853 A2 |   | 8/1993  |              |
| EP | 0619663 A2 |   | 10/1994 |              |
| GB | 1078296    |   | 8/1967  |              |
| GB | 1523753    |   | 9/1978  |              |
| JP | 401024659 A | * | 1/1989 | ............ H04M/1/60 |
| JP | 403029527 A | * | 2/1991 | ............ H04M/3/36 |
| JP | 404103234 A | * | 4/1992 | ............ H04B/17/00 |
| JP | 404207445 A | * | 7/1992 | ............ H04M/3/36 |
| JP | 408009353 A | * | 1/1996 | ............ H04N/7/14 |
| JP | 410224485 A | * | 8/1998 | ............ H04M/3/36 |

* cited by examiner

Primary Examiner—Melur Ramakrishnaiah
(74) Attorney, Agent, or Firm—Van Dyke, Gardner, Linn & Burkhart, LLP

(57) ABSTRACT

A remote site interactive system includes a host system having an instructor console, at least one remote system having a base unit and a communication system between the host system and the base unit which is adapted to communicate an instructor audio signal from the host system to the base unit and a responding audio signal from the base unit to the host system. The communication system includes an audio enhancer which enhances the audio signals by regulating signal level, signal muting and/or signal authenticity.

58 Claims, 20 Drawing Sheets

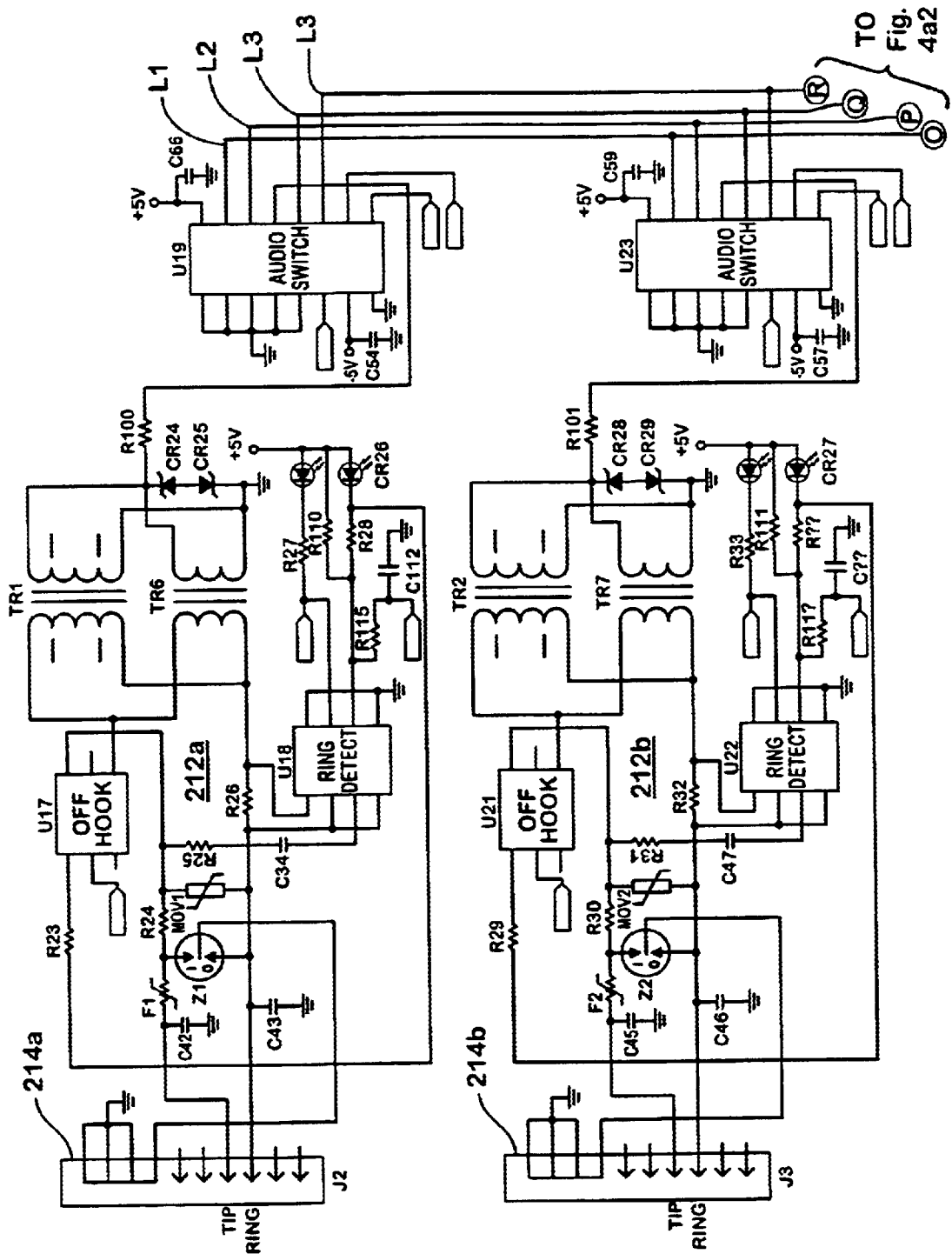
Fig. 4a1

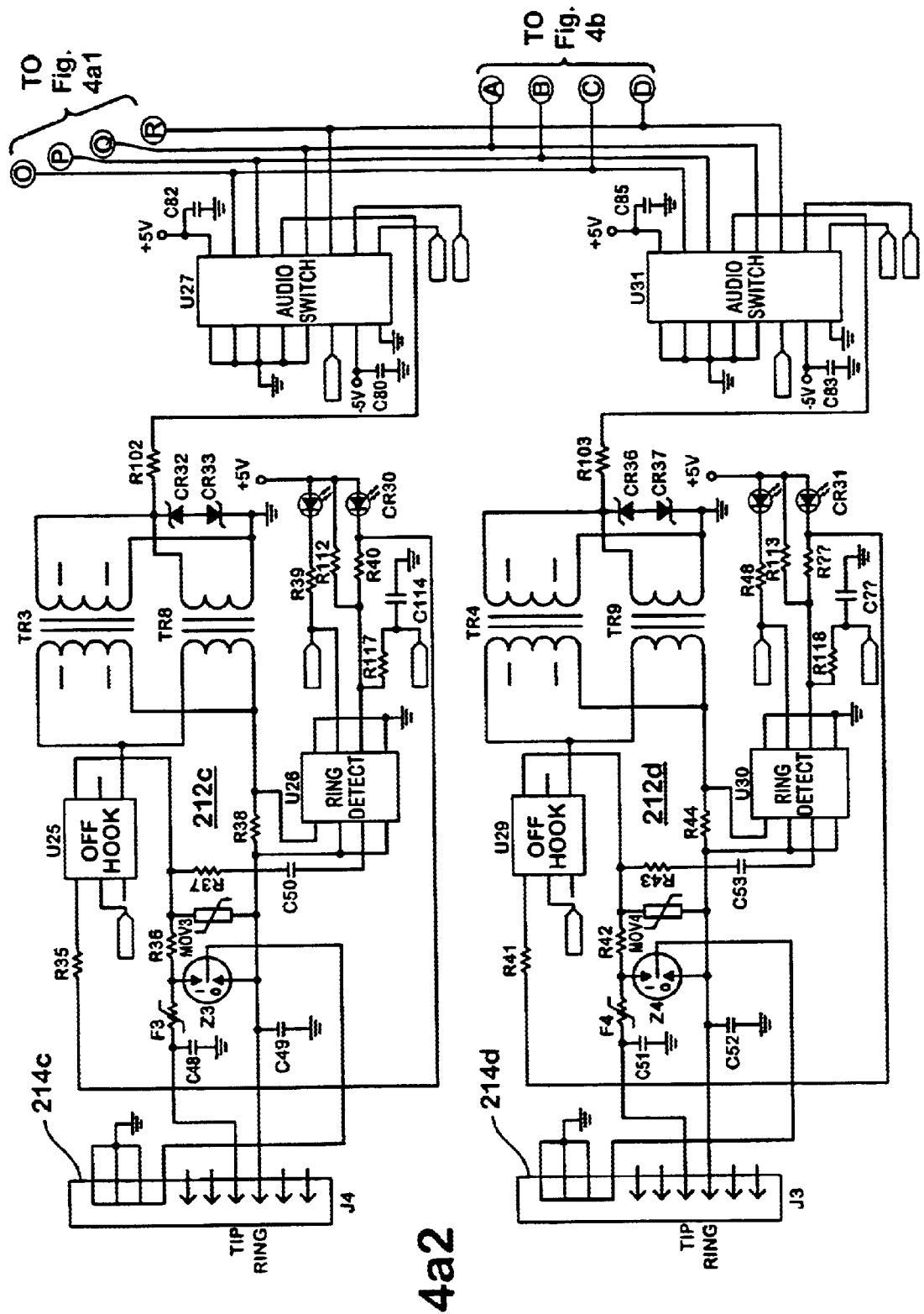
Fig. 4a2

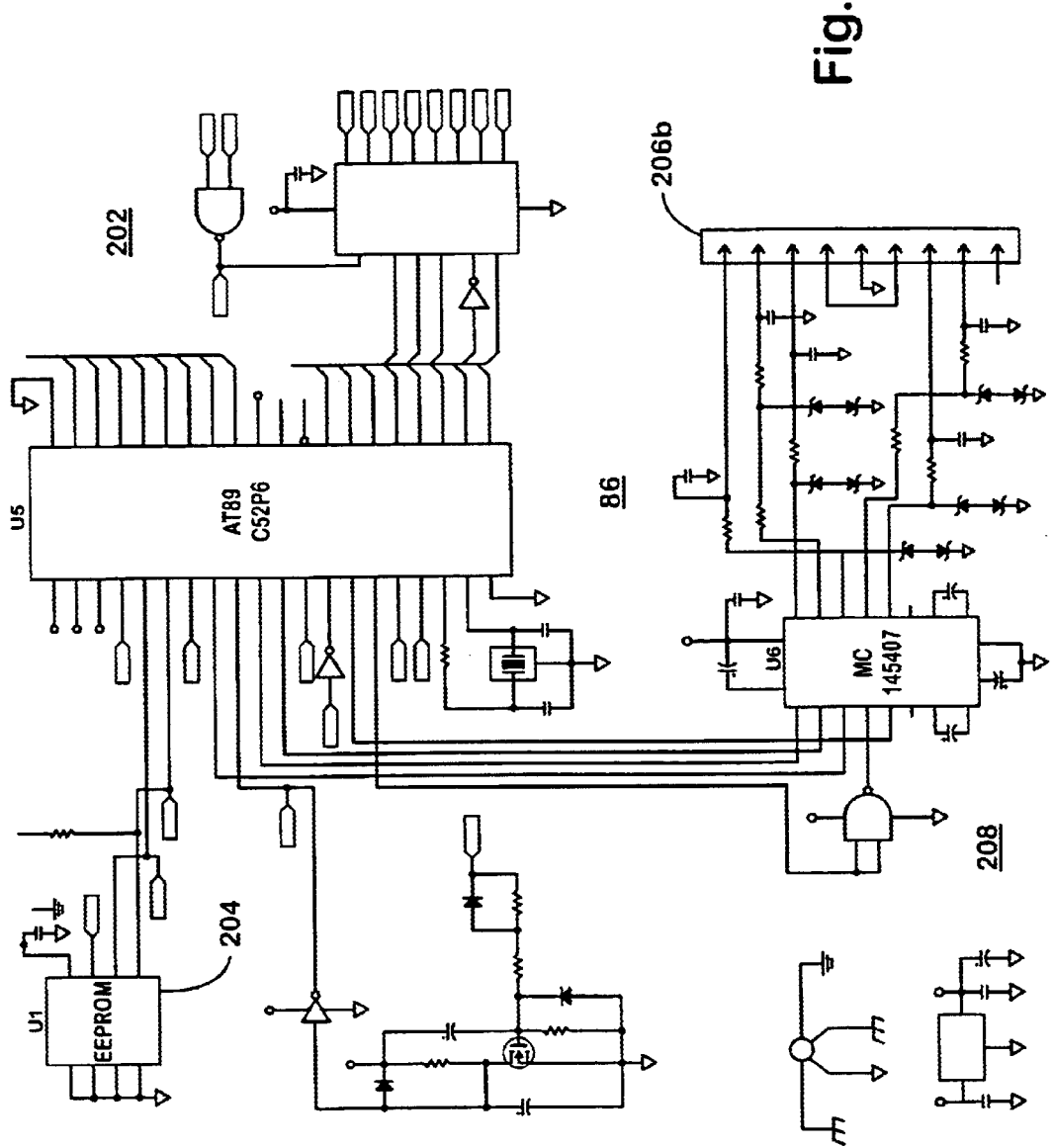
Fig. 4e1

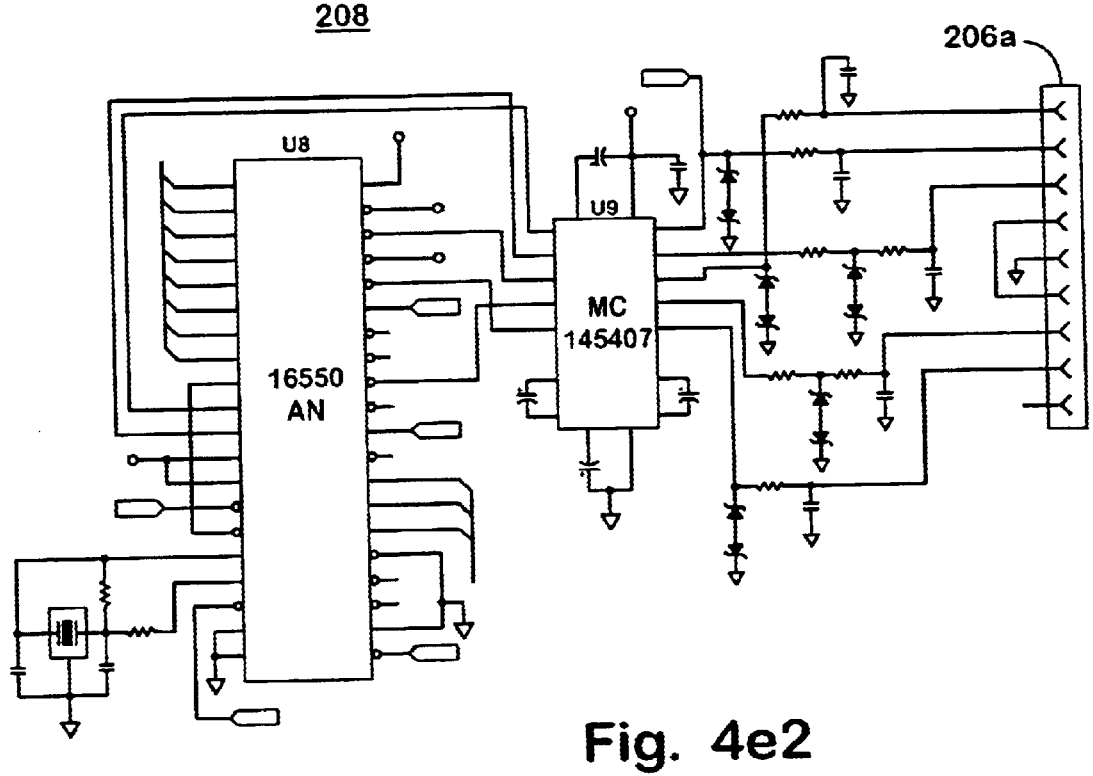
Fig. 4e2

REMOTE SITE INTERACTIVE SYSTEM

BACKGROUND OF THE INVENTION

The present invention relates to a remote interactive system including a host system with an instructor console for use by an instructor and at least one remote system intended to be located geographically remote from the host system. A communication system between the host system and a base unit at the remote system communicates an audio-video signal from the instructor to the remote site and an audio signal from the base unit to the host system thereby allowing interactive interaction between an instructor and one or more users, or respondents, at the remote site.

In such a remote interactive system, it is common to use a phone line to provide the audio link from the remote site to the host system. This typically requires an audio bridge to handle incoming calls from the remote sites. The audio bridge is typically a complicated computer-based system which is capable of handling many incoming calls. The audio bridge answers each incoming call and notifies the instructor at the instructor console of the call. Typically, a human will talk with the person placing the call in order to attempt to verify the authenticity thereby removing harassing calls from being placed to the instructor. Such system has many drawbacks. It is expensive and complicated and requires human intervention in order to attempt to eliminate calls originating from outside of the multiple-site interactive response system. This is not always possible if the caller is clever enough to convince the human intervenor that he/she is present at one of the sites. Therefore, the known audio bridge is unsatisfactory.

Another difficulty with multiple-site interactive response systems is in regulating the audio level of incoming calls to the host system. It is well known that the quality of phone line connection varies greatly from call-to-call. Therefore, if multiple sites are placing calls to the instructor console, the audio quality will typically be different for each site. Prior systems have attempted to overcome such variation in line quality by providing automatic gain control on the line. Such prior art automatic gain control works off the audio signal, namely the speaker's voice signal. The problem is that when the speaker pauses, the absence of a signal causes the automatic gain control to increase the gain. When the speaker then begins to speak, the automatic gain control reduces the gain in response to the voice signal. This results in a "pumping" of the gain which tends to amplify background noises and results in an overall unsatisfactory voice quality.

Remote site interactive systems usually include an instructor studio having an audio-video capture device, such as a video camera, and a communication channel to transmit the audio-video signal to the remote site or sites. The audio-video signal may be transmitted by any one of a number of means, such as a physical cable, a satellite link, or the like. Various transmission systems introduce delay into the signal which, typically, varies from system-to-system. Furthermore, even within a particular type of system, such as satellite transmission, various delays can be introduced by the transmission path. For example, if the transmission path is up to the satellite and down to the site, one delay will be encountered. If, instead, the signal is handed off from the first satellite to one or more secondary satellites and then to the site, a second, different, delay will be encountered. Other anomalies result in signal delay. For example, it is common to utilize signal compression and decompression in order to minimize transmission bandwidth. The compression and decompression process adds further delay to the signal. As a result, it is not uncommon to have as much as several seconds in delay between the signal origination at the instructor's studio and the image display at the remote site. Furthermore, the delay may be different from site-to-site. One site may utilize a satellite system and another site may utilize a cable system. In order to compensate for the delay, it is known to provide a muting function at the site. The muting function is built in to the system which "hands off" the two-way communication between the remote site and the instructor host site. Thus, as long as an instructor is talking, the microphone at the remote site is "dead" so that the person at the remote site cannot speak to the instructor. When the instructor pauses, the microphone at the remote site becomes "live" and the person at the remote site can speak. Because of the delay between the audio-video signal of the instructor and its receipt at the remote site, it is necessary to delay activation of the instructor's signal for a period of time at that remote site after the person at the remote site is finished talking in order to avoid coupling a portion of the person at that remote site's speech through the instructor consoles out to that remote site. It is desirable that the length of such muting is made equal to the delay in transmission from the instructor's console to the particular remote site. In the past, this has been accomplished by positioning a skilled technician at each remote site prior to its use. The technician manually sets the muting length by talking into the respondent's microphone and waiting for the signal to arrive back at that remote site through the host system. Such manual setting technique is undesirable because it requires a skilled technician to be located at each site, at least during its initial setup, and the manual adjustment of the muting which is a subjective procedure. If the muting is set too long, then there is an unnecessary delay in the communication between the instructor and each of the remote sites and a portion of the instructor's audio may be lost. If the muting is set too short, then a portion of the person at the particular remote site is captured at the instructor's console and forwarded to that remote site.

In multiple-site interactive response systems, it is known to provide response units to each of a plurality of users at a particular remote with a microphone built into each response unit. When a respondent wishes to address the instructor, the respondent signals by activating a "talk request" button which is communicated to the instructor's console. If the instructor selects that respondent, the system opens an audio signal from the microphone in the corresponding response unit to the instructor's console typically over a phone line. If the user places the response system far away from the user's mouth, such as on a desk surface in front of the user, the gain of the system must be set high enough to receive the voice of the user at a significant distance. If there is noise in the room, such as laughter, then the gain necessary to receive the speaker's voice at such distance will cause background noise to be picked up by the microphone. The background noise level can be great enough, especially in the case of laughter, that the system may not be able to "hand off" the user to the instructor. If the situation is remedied by decreasing the gain, then the only way the student can use the response unit is to hold the microphone close to the mouth of the user. However, by lowering the gain, the system will not adequately receive the user's voice if the response unit is placed far away from the user, such as on a desk. While it is known to provide audio compression in order to attempt to solve this problem, audio compression alone is inadequate to completely solve the problem.

SUMMARY OF THE INVENTION

The present invention provides a multiple-site interactive response system which overcomes the difficulties in the prior art in a manner which is effective and cost efficient.

According to an aspect of the invention, a remote interactive system includes a host system having an instructor console and at least one remote system having a base unit. A communication system is provided between the host system and the base unit which is adapted to communicate an instructor audio signal from the host system to the base unit and a responding audio signal from the base unit to the host system. According to this aspect of the invention, the communication system includes an audio enhancer which enhances one or more of the signal level, signal muting, and signal source authenticity between the instructor and the base unit.

According to another somewhat more detailed aspect of the invention, an interactive system for providing interaction between an instructor at an instructor location and a plurality of respondents located at at least one geographically separated site is provided wherein the interactive system is useful with an audio-video transmission system including a studio at the instructor location having audio-video equipment which supplies audio-video information and a communication system which downloads audio-video information from the audio-video equipment to an audio-video monitor at the geographically separated site. The interactive system includes a host system having an instructor console and an instructor microphone adapted to be used in a studio. The host system further includes a phone line manager adapted to be connected with at least one phone line. At least one remote system has a base unit and at least one respondent microphone wherein the base unit is adapted to be connected to at least one phone line. According to this aspect of the invention, the host system coordinates with the base unit to level the output of a phone line transmission from the base unit to the phone line manager. This may be carried out, according to the preferred embodiment, by the host system instructing the base unit to send a reference tone which is received by the phone line manager. The phone line manager, under command of the host computer, adjusts its gain in response to the level of the signal received. In this manner, the line is normalized without the use of the speaker's voice. This avoids the "pumping" action in the prior art. This allows multiple lines from multiple sites to be equalized notwithstanding substantial variation in line quality from each of the sites.

According to another aspect of the invention, in such interactive system, the host system coordinates with the base unit to validate phone calls received by the phone line manager. In a preferred embodiment, this is accomplished by the host system instructing the base unit to send a coded signal. The phone line manager then responds only if such coded signal is received from the base unit. If a phone call is placed to the phone line manager, which does not include such coded signal, the phone line is disconnected. This provides exceptional integrity to the system because it ensures that only phone calls can be placed from remote sites and anyone attempting to dial into the system from elsewhere, except from a particular remote site, will be ignored.

According to another aspect of the invention, in such an interactive system, the host system coordinates with the base unit to measure communication system delay between audio-video equipment in an instructor's studio and an audio-video monitor at the geographically separated site. In a preferred embodiment, this is accomplished by the host system sending a test signal over the communication system which the base unit receives. The host system is informed when the test signal is received which thereby determines the amount of delay. This delay is used to establish muting of the audio-video system.

According to yet another aspect of the invention, in such an interactive system, the host system has control over the sensitivity of the respondent microphone at the base unit. In a preferred embodiment, the host system is capable of switching the respondent microphone between a "Close Talk" and "Far Talk" state. In the "Close Talk" state, the respondent microphone has a lower gain. In the "Far Talk" state, the respondent microphone has a higher gain. This allows the host system to have control over the particular arrangement of the host site. This is especially desirable when the respondent microphone is located in each of a plurality of response units which are provided to users such that the user talks directly into a microphone in that user's response unit.

A method of enhancing audio signal transmission from either the host system or the base unit to the other of the host system or the base unit in such interactive system, according to an aspect of the invention, includes sending a test signal from either the host system or the base unit and analyzing the test signal received at the other of the host system or the base unit. This provides the unique ability to enhance the audio signal transmission by facilitating automatic enhancement of signal level, signal muting, and signal source authenticity.

These and other objects, advantages, and features of this invention will become apparent upon review of the following specification in conjunction with the drawings.

BRIEF DESCRIPTION OF THE DRAWINGS

FIGS. 4a–4e are an electrical schematic diagram of the phone line manager in FIG. 2;

DESCRIPTION OF THE PREFERRED EMBODIMENT

Figure 1:
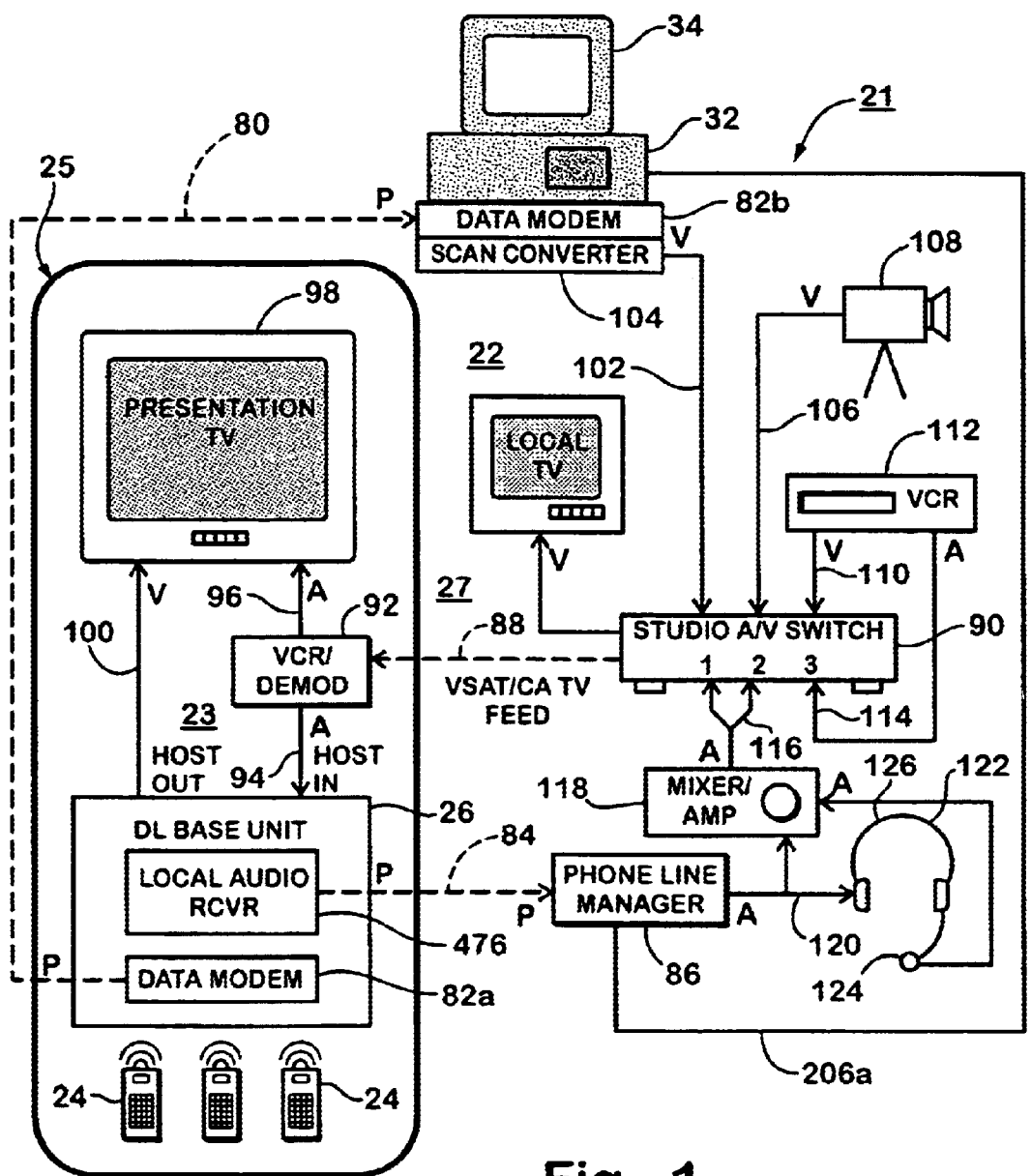
FIG. 1 is a block diagram of an interactive response system according to the invention shown with one remote site base unit, although multiple such remote site base units may be used at multiple remote sites.
Figure 2:
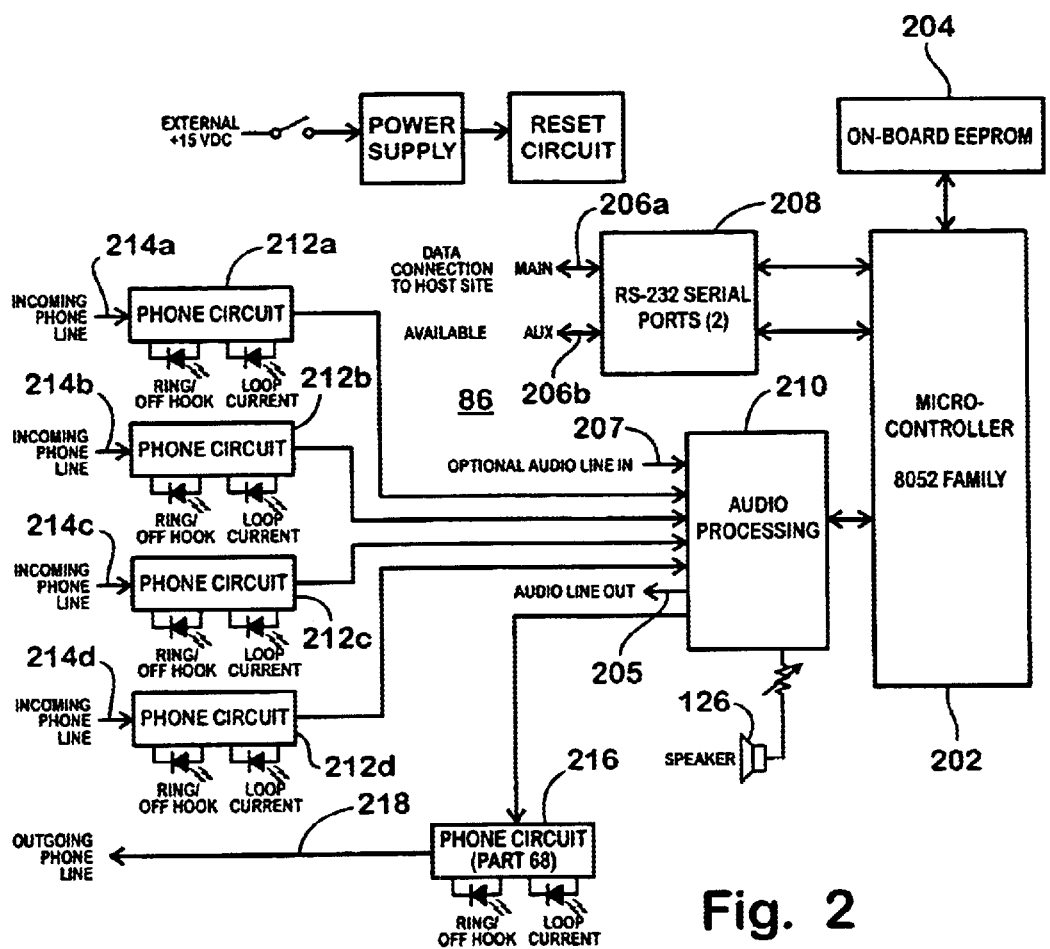
FIG. 2 is a block diagram of an electrical system of a phone line manager according to the invention.
Figure 3:
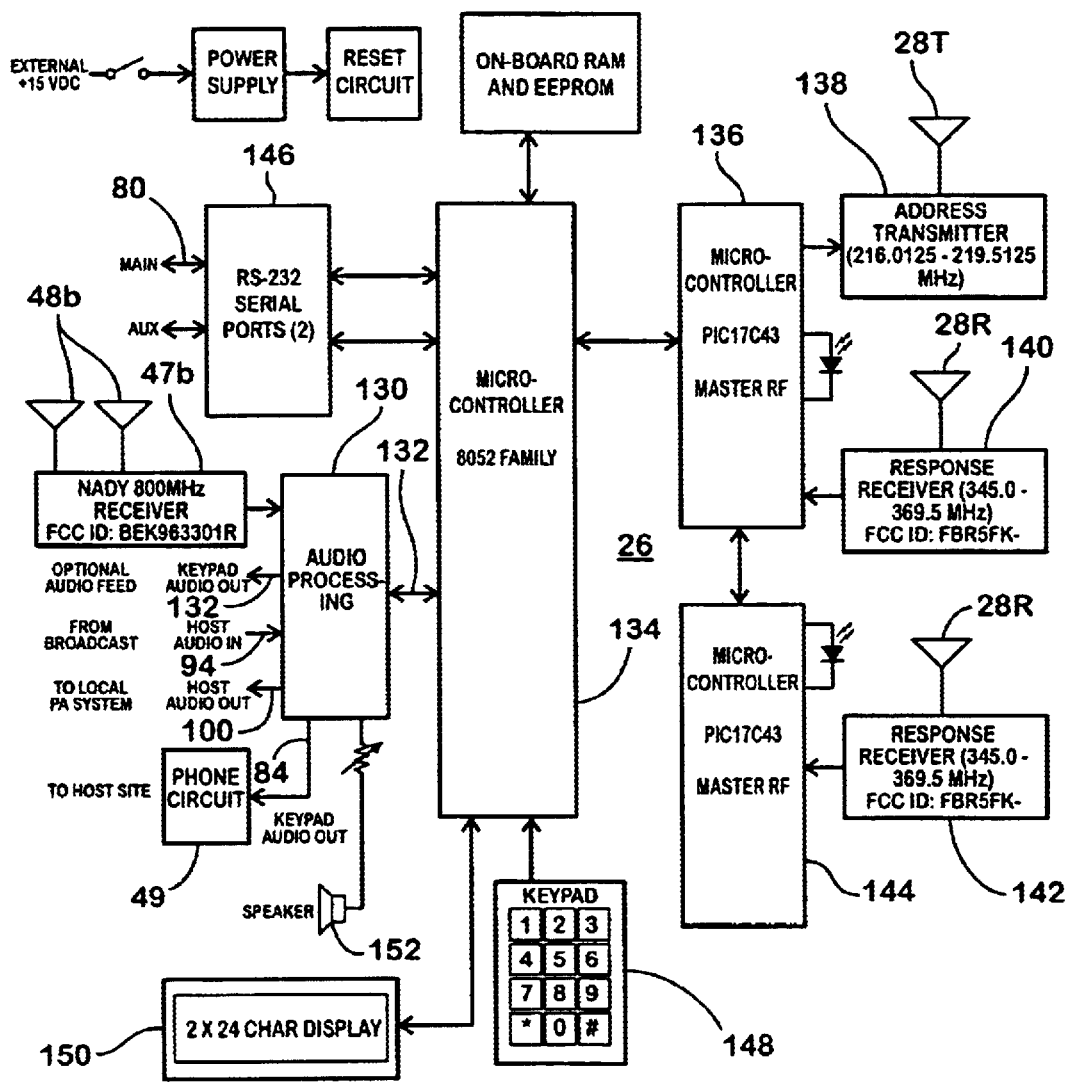
FIG. 3 is a block diagram of an electrical system of a base unit manager according to the invention.

Referring now specifically to the drawings, and the illustrative embodiments depicted therein, a multiple-site interactive system 20 provides interaction between an instructor (not shown) at a central location 21 and respondents (not shown) at at least one geographically separated site 25 (FIG. 1). Such interactive system is disclosed in detail in commonly assigned co-pending application Ser. No. 07/735,649 filed Oct. 24, 1996, by Harry G. Derks et al. for a MULTIPLE SITE INTERACTIVE RESPONSE SYSTEM, the disclosure of which is hereby incorporated herein by reference and will not be repeated in detail. Suffice it to say, the central control host system 22 includes an instructor's console including a computer 32 having a display 34 and an instructor selection device such as a locating device or a "mouse," a touch screen, or the like. Remote system 23 includes a base unit 26 and at least one respondent microphone. Preferably, the remote system includes a plurality of response units 24, each of which includes a respondent microphone 46. In addition to the function set forth herein, interactive response system 20 retrieves at central location 21 responses from a plurality of respondents (not shown) located at geographically separated site 25 entered in response units 24, each of which is provided to a respondent at the remote site. Host system 22 is interconnected with each remote system 23 by a telecommunication system, or network, generally indicated at 27. Communication network 27 includes a data link 80 for providing a two-way exchange of data between base unit 26 and host computer 32. In the illustrated embodiment, data link 80 is established between a data modem 82a and base unit 26 and a data modem 82b and host computer 32. Communication network 27 further includes an audio link 84 in order to provide audio communication from base unit 26 and a phone line manager 86, the latter often located at central location 21. In most applications, the audio link provides a one-way audio communication from the base unit 26 to host system 22. Data link 80 and audio link 84 are preferably provided by conventional plain old telephone service (POTS) interconnection, but might be alternatively supplied by a digital network such as ISDN or a digital simultaneous voice and data (DSVD) system. Additionally, asynchronous transfer mode (ATM) data transfer may be used. Data and audio communications could also be transferred over an Internet or Intranet. Other communication links will be apparent to the skilled artisan. It should be understood that data link 80 and audio link 84 are not, per se, intended to be part of the invention.

Communication network 27 also includes at least an audio and, preferably, a combined audio-video feed 88 from central location 21 to a video monitor 98 at remote site 25. Preferably, the audio-video feed 88 is supplied to demodulator 92 which demodulates the audio-video feed and supplies the video feed 96 to video monitor 98. Demodulator 92 also provides an audio input 94 to base unit 26. Base unit 26 processes the audio signal received on input 94 for echo suppression and provides an audio output 100 to monitor 98. Monitor 98 is viewable by the users, or respondents, at geographically separated site 25. As previously set forth, each such user is preferably provided with a response unit 24.

Audio-video link 88 may be supplied from an audio-video switch 90 which provides an output to audio-video link 88 and which is provided with a first video input 102 from a scan converter 104. Scan converter 104 converts images developed by computer 32 and displayed on display 34 to a composite video signal or other suitable video format. Audio-video switch 90 may additionally receive a video input 106 from an auxiliary device, such as a video camera 108, in order to, for example, capture video images of the instructor or material being handwritten by the instructor on an easel or the like. Audio-video switch 90 may additionally receive a video input 110 from a videocassette recorder 112 in order to provide feed of prerecorded instructional information and the like.

Figure 6:
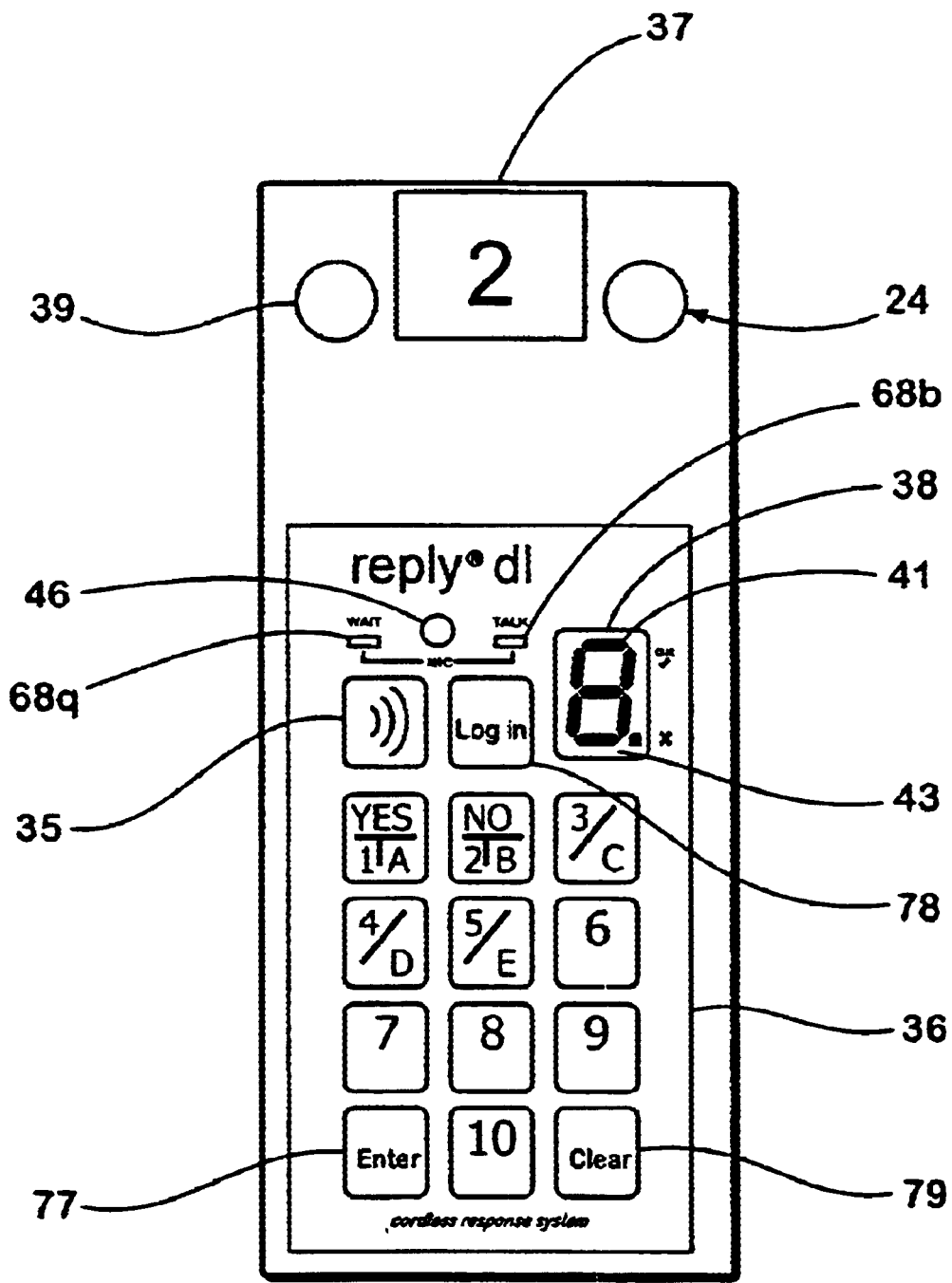
FIG. 6 is a top plan view of a response unit useful with the invention.
Figure 7:
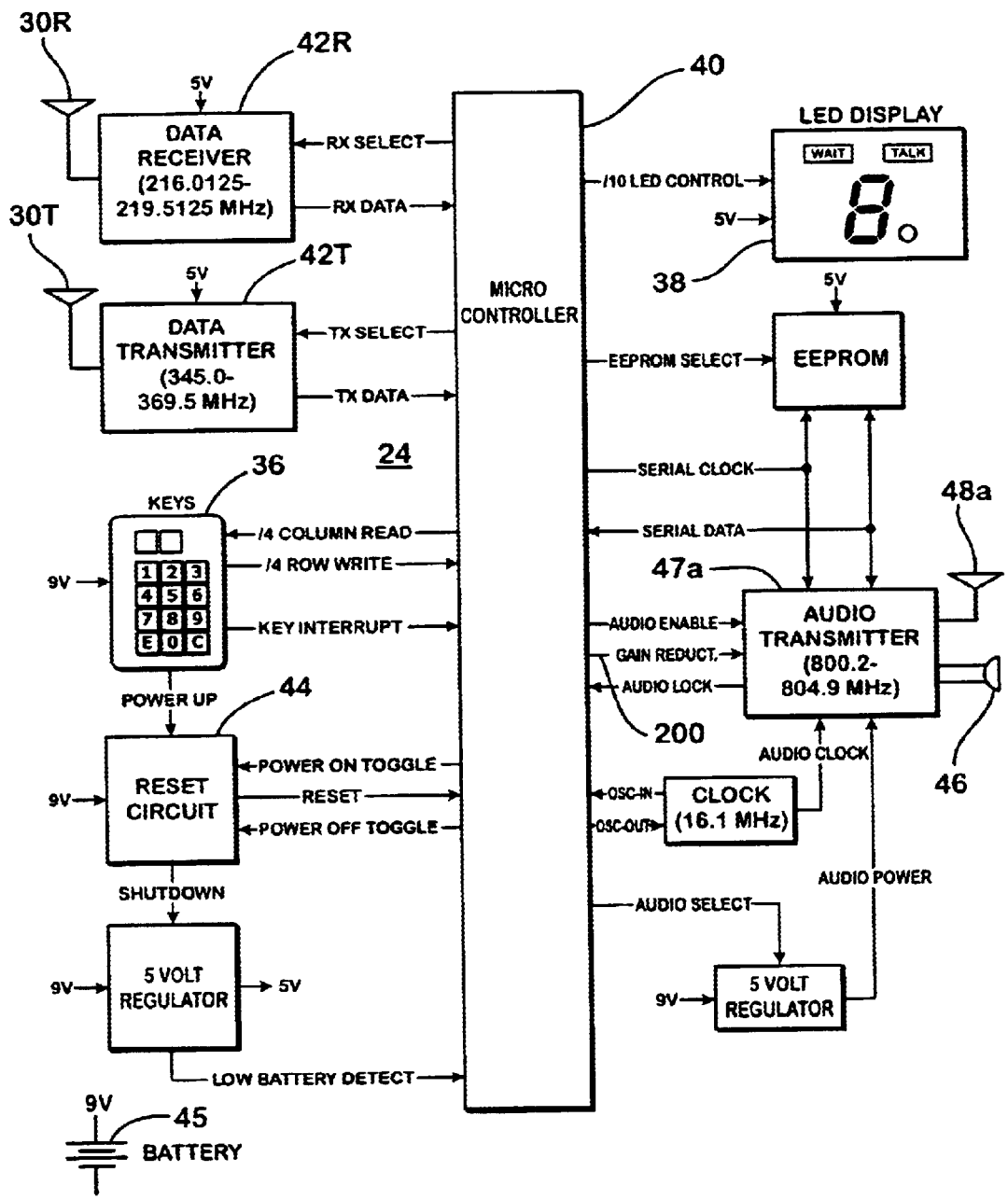
FIG. 7 is a block diagram of an electrical system of the response unit in FIG. 6.

Each response unit 24 includes an input device, such as a keypad 36, in order to receive user responses and a display device 38 in order to display responses entered on keypad 36 as well as information transmitted from base unit 26 in a manner set forth below (FIGS. 6 and 7). Keypad 36 includes a call-request key 35, which, when actuated by the user, requests an audio connection with host system 22, a log-in key 78, which, when actuated, places the response unit 24 in a mode to receive a fixed number of digit entries corresponding to a student identification number, or the like, an enter key 77, which is actuated by the user when transmitting multiple digit responses, and a clear key 79, which clears any digits entered by the user provided the entered responses have not been transmitted to the base unit in a manner which will be set forth below. Response unit 24 additionally includes a microphone 46, which picks up the respondent's voice up to a distance of between approximately 15 inches and approximately 25 inches and preferably approximately 20 inches at normal voice amplitude when in a "Far Talk" mode and up to a distance of between approximately 2 inches and approximately 6 inches and preferably approximately 3 inches when in a "Close Talk" mode, as will be set forth in more detail below. In the illustrated embodiment, microphone 46 is an electret condenser type. A WAIT indicator 68a is illuminated by the base unit 26, typically under the control of host system 22, in response to the user actuating the call-request key 35 indicating that the user assigned to that response unit is on a call list displayed to the instructor on display 34. A TALK indicator 68b is actuated by base unit 26, which issues a TALK COMMAND in response to a TALK INSTRUCTION issued by host computer 32. As will be set forth in more detail, when TALK indicator 68b is illuminated, an audio channel is opened between microphone 46 of that response unit 24 and host system 22.

Response unit 24 additionally includes a microcontroller, or microprocessor, 40 which is interconnected with keypad 36 and display 38 for active interface with the user of the response unit. A power management circuit 44 activates audio transmitter 47a and data transceiver 42 only when a transmission is to occur in order to conserve the life of battery 45. In the illustrated embodiment, audio transmitter 47a is a four-channel audio transmitter which transmits in the frequency range of at least 500 megahertz and preferably in the range of approximately 800 megahertz. More preferably, audio transmitter 47a transmits four channels in the 800 to 805 megahertz range. This frequency range is much higher than would be required to provide wireless communication of audio signals. However, the higher frequency range reduces the size of antennae 48a to be able to fit within the housing of the response unit. Additionally, this frequency range accommodates multiple channels which gives a greater chance of finding a clear channel by choosing between the channels. Data transceiver 42 includes a data transmitter 42T which transmits over one of eight channels in the 345 to 370 megahertz range. Data transceiver 42 additionally includes a separate receiver 42R, which receives up to eight channels in the 216 to 220 megahertz range. The response unit includes a "Close Talk gain reduction" output 200 from microcontroller 40 to audio transmitter 47a. When microcontroller 40 actuates output 200, the gain of audio transmitter 47a is reduced as will be set forth in detail below.

Base unit 26 includes an audio receiver 47b and corresponding antennae 48b, which is provided as an input to an audio-processing circuit 130 (FIGS. 3 and 5a–5e). Audio receiver 47b is configured to receive audio signals transmitted by the audio transmitter 47a of each response unit 24. Audio-processing circuit 130 has an output 132 utilized for local site distribution and a connection with a phone circuit 49 which is provided to audio link 84 for transmission to host system 22 of audio signals inputted to the microphone 46 of a response unit 24 whose audio transmitter 47a is activated in a manner which will be set forth in detail below. In the illustrated embodiment, phone circuit 49 is POTS compatible and includes a dialer but could, alternatively, be made compatible with any available voice communication technology. Audio-processing circuit 130 additionally receives an audio signal 94 from demodulator 92 and produces an output 100 which is supplied to the presentation monitor 98 under the control of a microcontroller 134. Microcontroller 134 interfaces with a master RF microcontroller 136 which formats base data packets for transmission to response units 24 by an address transmitter 138. Master RF microcontroller 136 additionally receives and decodes response data packets received from response units 24 using a response receiver 140. A second response receiver 142 communicates with a slave RF microcontroller 144, which, in turn, communicates with master RF microcontroller 136. Response receivers 140, 142 operate in the same bands as transmitter 42T of each response unit. Address transmitter 138 operates in the same band as receiver 42R of each response unit. Redundant response receivers 140, 142 enhance the capability of the base unit in receiving a response from each response unit. Thus, for example, if a response unit is in a "blind spot" with respect to one of the receivers 140, 142, it is possible that the other receiver will receive the signal. Base unit 26 additionally includes a pair of serial ports 146 for interconnection with data modem 82a and an optional auxiliary device (not shown), such as a projection controller, a house-lighting controller, or the like. Serial ports 146 may be in the RS-232 or other conventional format. Base unit 26 additionally includes a keypad 148, display 150, and a speaker 152 for use by an operator in setup or for diagnostic purposes.

When the respondent is speaking through microphone 46, the base unit 26 at the geographically separated site 25 at which the caller is located, blanks the audio output 100 to the corresponding monitor 98. This audio suppression, or muting, prevents feedback as is well known in the art. As will be set forth in more detail below, host computer 32 sets a delay for the base unit 26 that causes the base unit at the geographically separated site 25 at which the caller is located to blank the audio output 100 to the corresponding monitor 98 for an additional period of time, designated "D," which corresponds to the delay time experienced by the audio-video signal sent out over audio-video link 88 as will be set forth in more detail below. The blanking does not take place at the other remote sites, namely those not having a call originating therefrom.

Phone line manager 86 includes a microcontroller 202 having an on-board memory, such as EEPROM 204 (FIGS. 2 and 4a–4e). Microcontroller 202 is connected through a port 203 to computer 32. Phone line manager 86 additionally includes an audio-processing circuit 210 which is interconnected with microcontroller 202 and with a plurality of incoming phone circuits 212a–212d. Each phone circuit 212a–212d provides interface with an incoming phone line illustrated at 214a–214d. Audio-processing circuit 210 is additionally connected with an outgoing phone circuit 216 and with main and auxiliary ports 206a, 206b, which, in the illustrated embodiment, are supplied by RS-232 serial interface circuit 208. As will be set forth in more detail below, phone line manager 86 can, conveniently, be located physically remote from host computer 32 and interconnected with host computer 32 through a first outgoing phone line 218 supplied through phone circuit 216 and a second phone line supporting a data modem on the port 206a. This allows phone line manager 86 to be located permanently at a particular location in a building, such as in a utility closet or the like. However, central computer 32 may be conveniently moved around to any location either within the particular building or outside a particular building while receiving calls from phone line manager 86 through phone circuit 216 and exchange data signals through modems connected respectively with the central computer and with port 206a. The phone line manager 86 additionally includes an audio line-out 205 which may be supplied over line 120 to a mixer/amplifier 118 in order to feed the respondent's audio signal to audio/video switch 90, or the like. Line 120 may additionally be fed to the instructor's headset 126. Phone line manager 86 may additionally include an audio line-in 207 which allows two or more phone line managers 86 to be ganged by connecting an audio line-out 205 of one phone line manager to the audio line-in 207 of another phone line manager with the audio line-out 205 of the another phone line manager being supplied to the line 120.

Each phone line circuit 212a–212d is a conventional phone line interface including a ring detect circuit U18, U22, U26, U30 and a circuit which takes the phone line off-hook U17, U21, U25, U29. Outputs of each phone line circuit 212a–212d are supplied to an audio switch U19, U23, U27, U31, respectively. Each audio switch has four outputs, one supplied to each of audio lines L1, L2, L3 and L4. Audio switch U19, U23, U27, U31 is under the control of central computer 32 and collectively allows any incoming phone line 214a–214d to be supplied to any line L1–L4 whereby up to four incoming calls can be received at a time. This provides the ability to conference together multiple callers from multiple sites. Lines L1–L4 are each supplied to a fixed gain amplifier U33 whose output is supplied to a respective diode CR41, CR42, CR43 and CR44. The output of each diode is a DC signal which is proportional to the strength of the audio signal on the respective line L1–L4. The outputs of diodes CR41–CR44 are supplied as inputs to an analog-to-digital converter U35. The outputs of A/D converter U35 are accessible by computer 32 to allow the level of a signal on each line L1–L4 to be measured. Each line L1–L4 is supplied to a digitally gain-controlled amplifier U34, U36 which allows the gain on each line to be individually digitally controlled by computer 32 to provide a normalized output at lines L1', L2', L3' and L4'.

The audio signals on lines L1'–L4' are combined with each other and with any signal supplied to a "local in" jack 207 and amplified by a fixed gain amplifier U37 and supplied to a "local out" jack 205. This allows a composite audio signal provided on local output 205 of one phone line manager 86 to be supplied to a "local in" jack 207 of another phone line manager 86 and be combined with the audio signals of that phone line manager in the manner previously described. The signal applied to "local out" jack 205 is also amplified and supplied to a speaker 126 for use in monitoring operation of the phone line manager 86. As will be set forth in more detail below, analog/digital converter circuit U35 allows the level of a test signal generated by base unit 26 to be measured by computer 32 and digitally gain-controlled amplifiers U34 and U36 allow computer 32 to adjust the gain of each line in order to normalize that line to a level in response to the measuring of the test signal sent from the base unit. Phone line manager 86 additionally includes a touch-tone generator U40 which supplies touch tone signals to phone line circuit 216. This allows microcontroller 202 to dial out with phone line circuit 216 to make a phone line connection with the central unit 21 when phone line manager 86 is located remotely from the central unit. Touch-tone-generating circuit U40 also supplies a signal which is combined with audio buses L1'–L4' and any "local in" signal 207 and amplified by amplifier U37. This allows the phone line manager to generate audio tones which are supplied by the central unit to measure delays in transmission over communication network 22 and to set the level of audio signals sent by base unit 26 over line 100 to monitor 98.

Figure 4B:
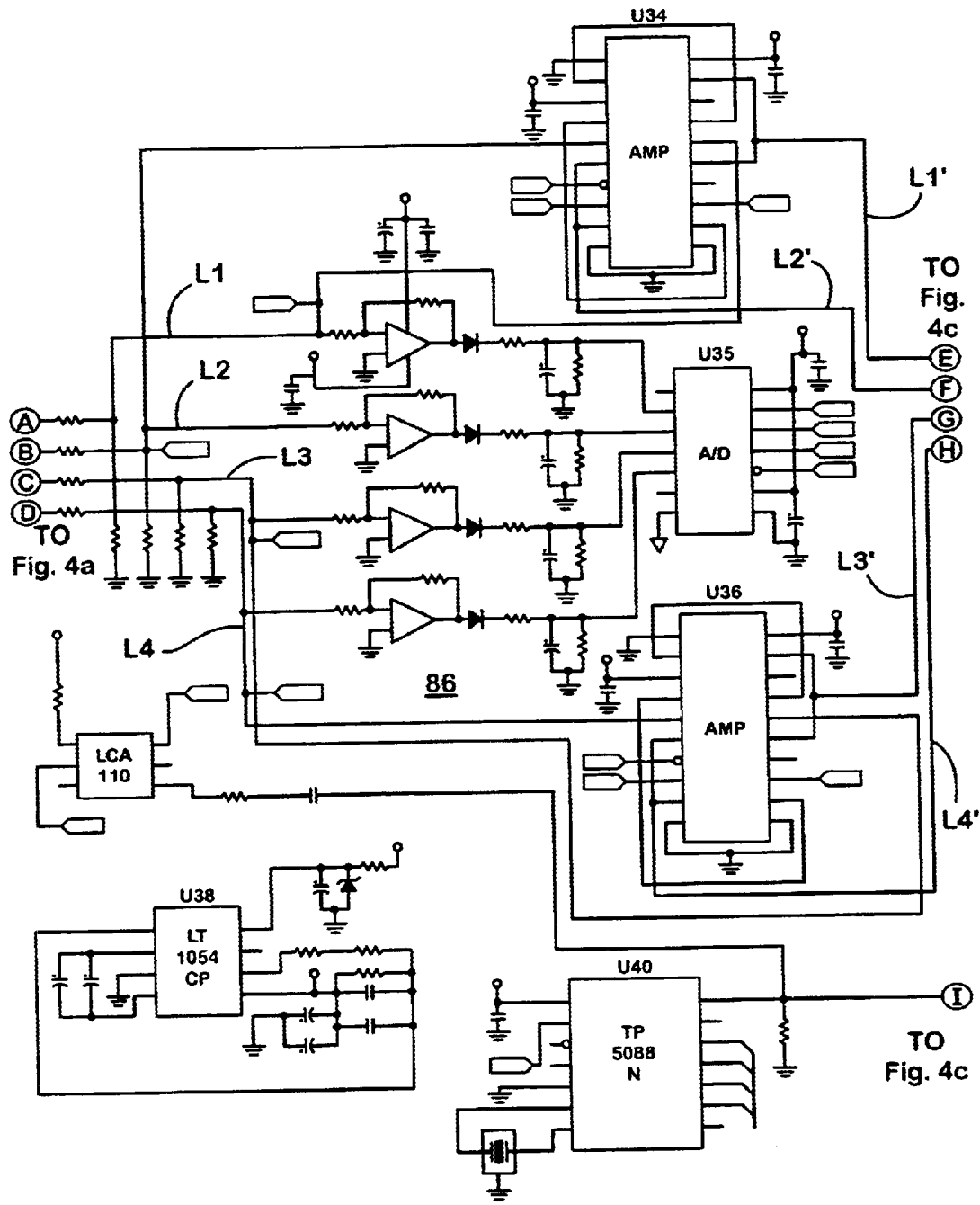
Figure 4C:
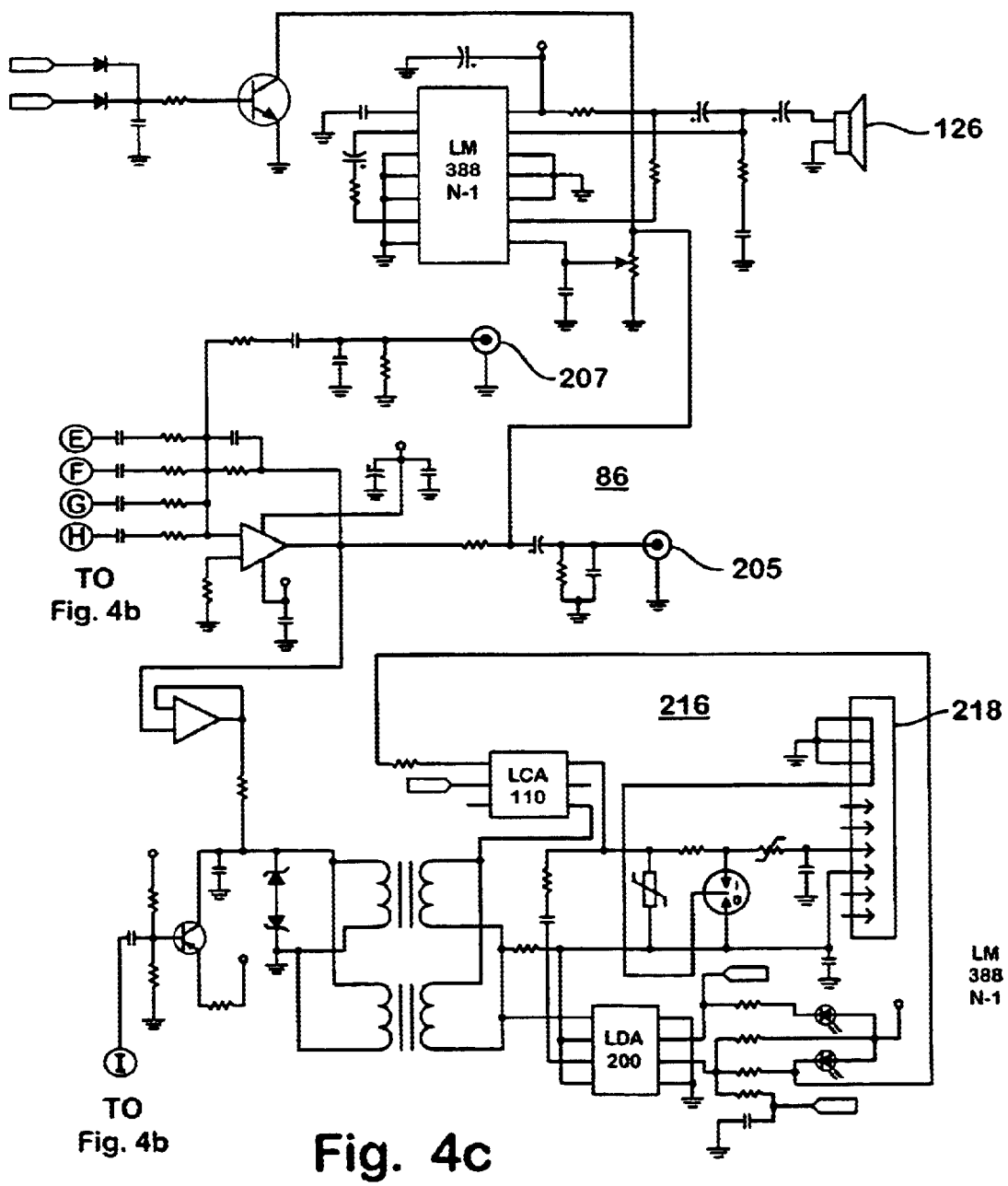
Figure 4D:
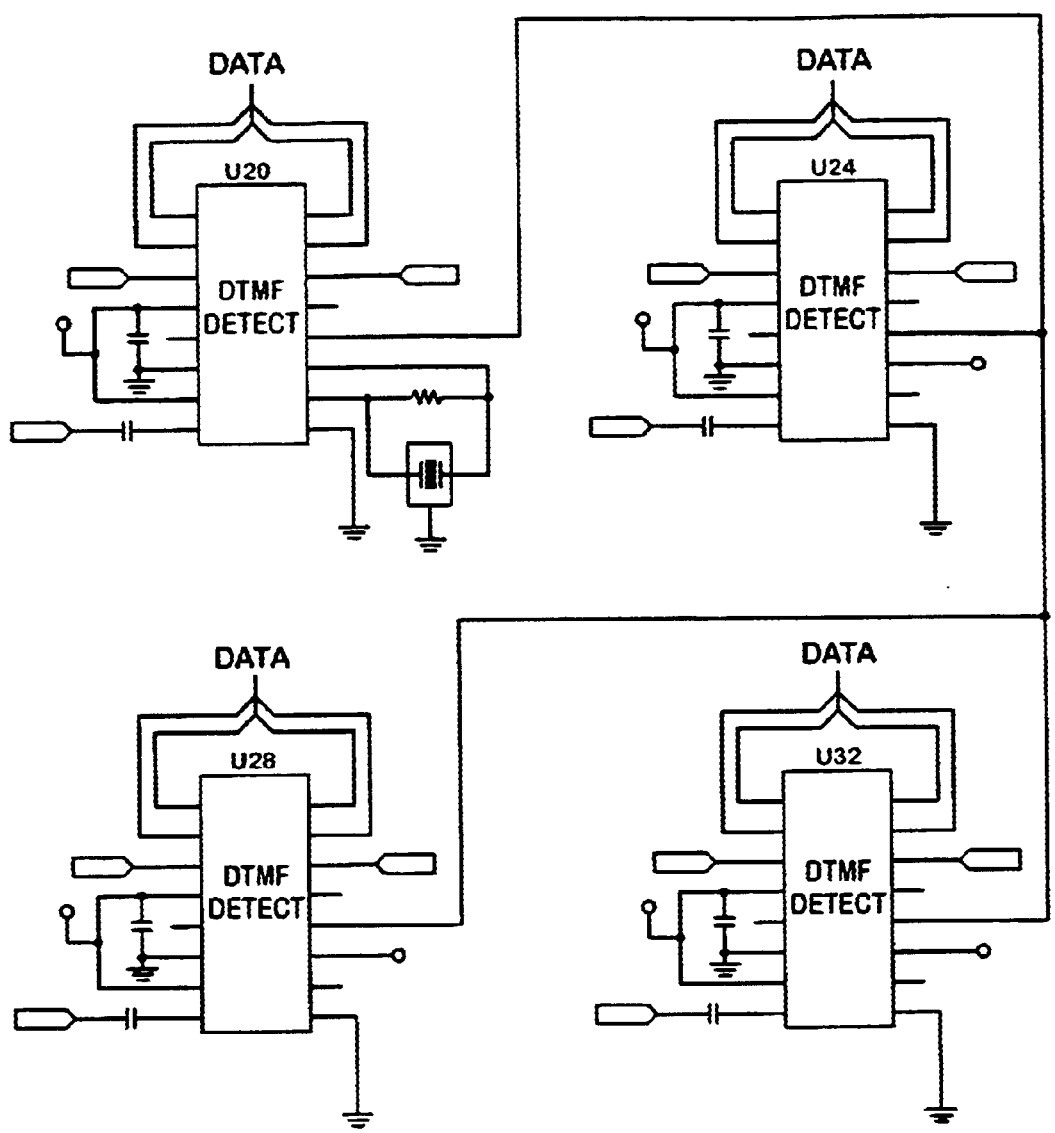

Phone line manager 86 includes a plurality of DTMF detection circuits U20, U24, U28 and U32 (FIG. 4*d*). Each circuit U20, U24, U28 and U32 is connected with an audio bus L1–L4 and provides the capability to decode a DTMF tone on the respective audio bus. This provides phone line manager 86 the ability to decode DTMF tones supplied to incoming phone lines 214*a*–214*d*. As will be set forth in more detail below, computer 32 instructs base unit 26 to send a particular sequence of encoded DTMF tones. The encoded DTMF tones are decoded by a respective circuit U20, U24, U28 and U32 under the control of processor 202. Each circuit U20, U24, U28, U32 is capable of decoding multiple sequential tone signals by sending a flag to processor 202 which then reads the output of that detection circuit allowing the next tone to be decoded and read in this fashion. After the tones are read by microcontroller 202, they are transferred to computer 32. In this manner, the host system is a able to ensure the validity of a call placed to phone line manager 86 as will be described in more detail below.

Microcontroller 202 is made up of a processor U5 having an on-board EEPROM memory 204 in the form of circuit U1. A decoding circuit U7 allows microcomputer U5 to provide control over internal circuits of phone line manager 86. Microcontroller 202 is connected with an RS-232 serial circuit U6 which interfaces with a port 206*a*. This allows microcomputer U5 to send and receive serial signals. A universal asynchronous receiver/transmitter (UART) U8 interfaces with an RS-232 circuit U9 in order to provide auxiliary serial port 206*b*. As previously set forth, one of the serial ports 206*a*, 206*b* provides the ability for the phone line manager to send control signals over a communication line via modem to the central unit thereby allowing the central unit in the phone line manager to be remotely located from one another. The other port 206*a*, 206*b* may be used to control external devices or to cascade phone line managers in the manner previously described.

Figure 5A:
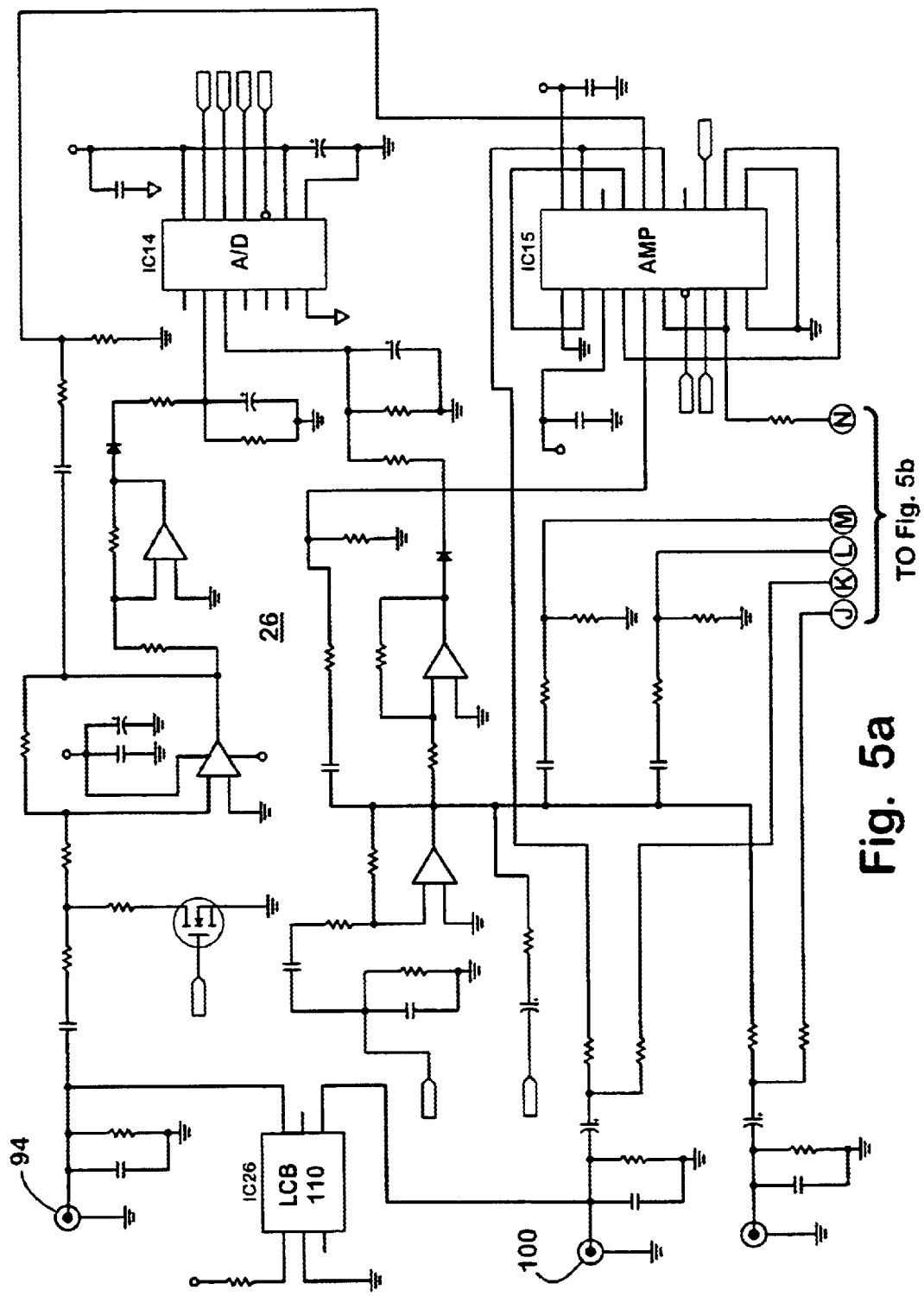
FIGS. 5a–5e are an electrical schematic diagram of the base unit in FIG. 3.

Base unit 26 includes an analog-to-digital converter IC14 which receives a first input from broadcast audio in port 94, which is amplified and then converted to a DC level by diode D14 in order to provide the capability for producing a digital value representing the level of the audio signal at port 94 (FIG. 5*a*). IC14 also receives an input from connector P5 (NADY in) which represents the audio level of signals received from a microphone 46 of the response unit 24 whose microphone is actuated. The NADY in signal is received through IC13*a* and IC13*d* and then converted to a DC signal by diode D15. A/D converter IC14 can be interrogated by microcontroller 134 to allow the determination of audio levels received from communication system 27 and from the respective response unit 24. Base unit 26 additionally includes a gain switch Q3 which can be switched between a low gain and a high gain condition in order to adjust the input signal range of the base unit. The base unit further includes a switch IC26 which provides a direct feed from broadcast audio in port 94 to broadcast audio out port 100 when the power is turned off, but, otherwise, provides an open circuit. A local audio out J3 provides the capability to output audio signals received from the response unit microphones in order to allow the audio signal to be reproduced on a loudspeaker system, or the like, for large room settings. Base unit 26 additionally includes digitally gain-controlled amplifiers IC15 and IC20. These allow the gain of the broadcast audio out and the local audio out signals to be digitally adjusted for proper level control. Additionally, IC15 may be switched between a normal gain condition and a very low gain condition in order to allow the signal from the communication system 27 to be muted. This muting function, which is discussed elsewhere herein, allows the signal from the central unit to be muted sufficiently long to prevent feedback of the respondent's voice speaking in a microphone 46. IC20 provides amplification control for the signal output on local audio output J3.

Figure 5B:
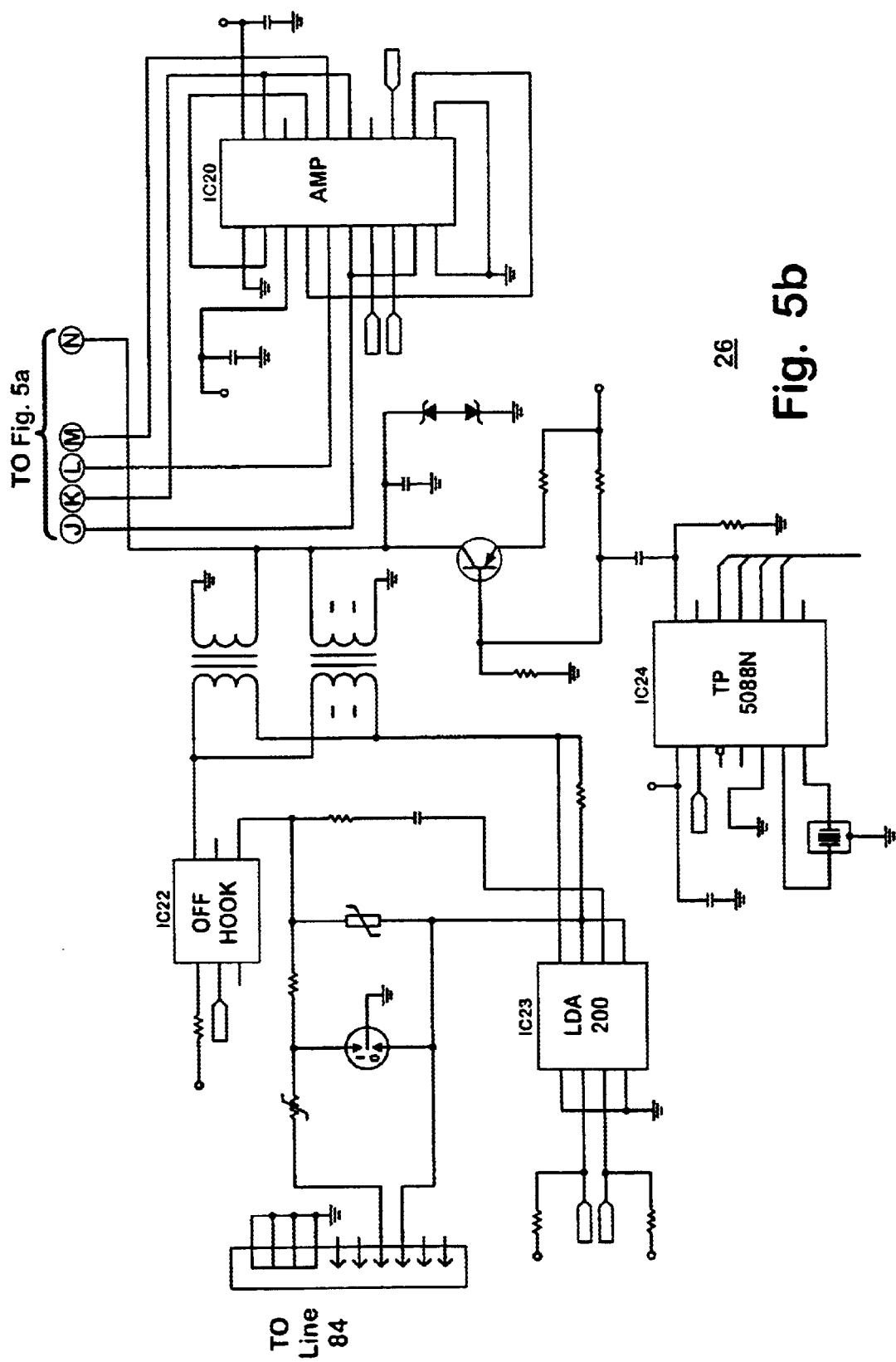
Figure 5C:
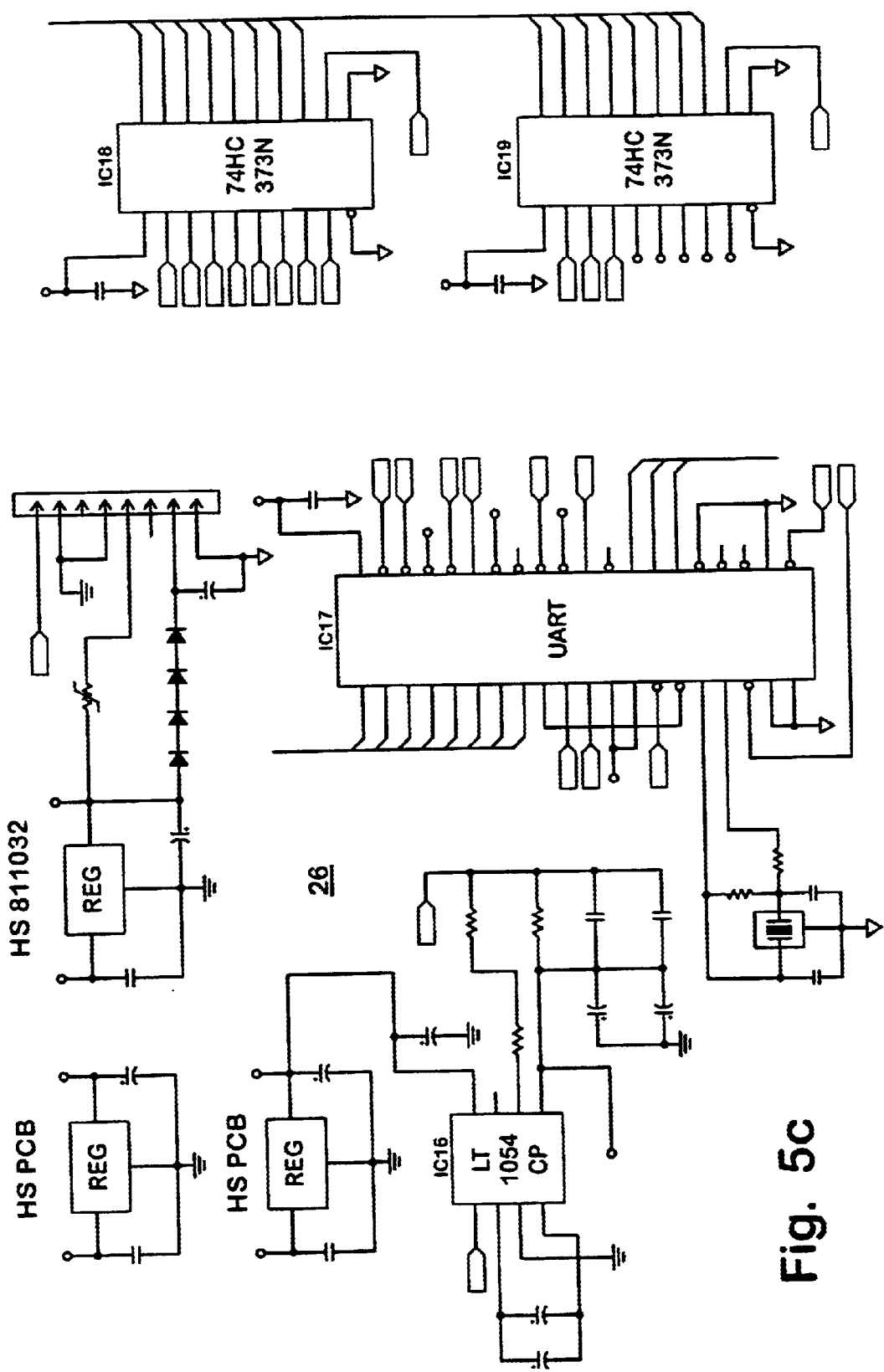
Figure 5D:
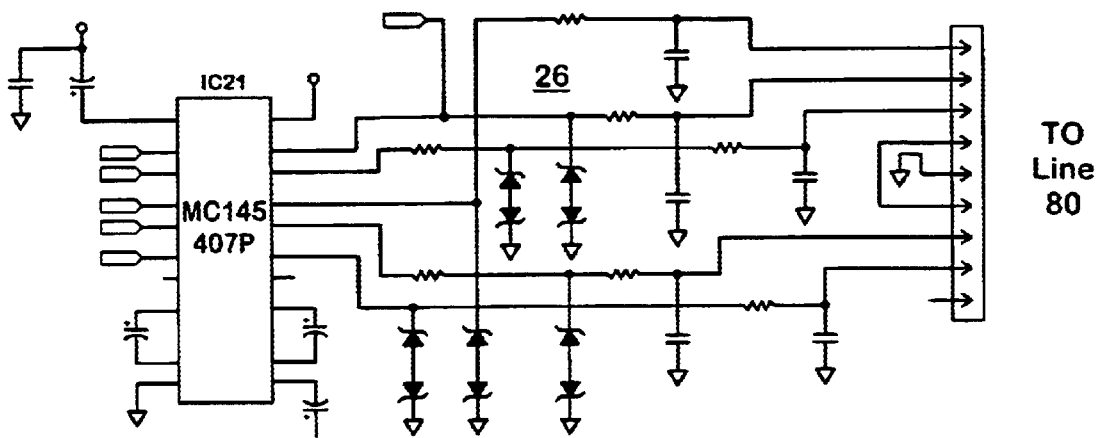
Figure 5E:
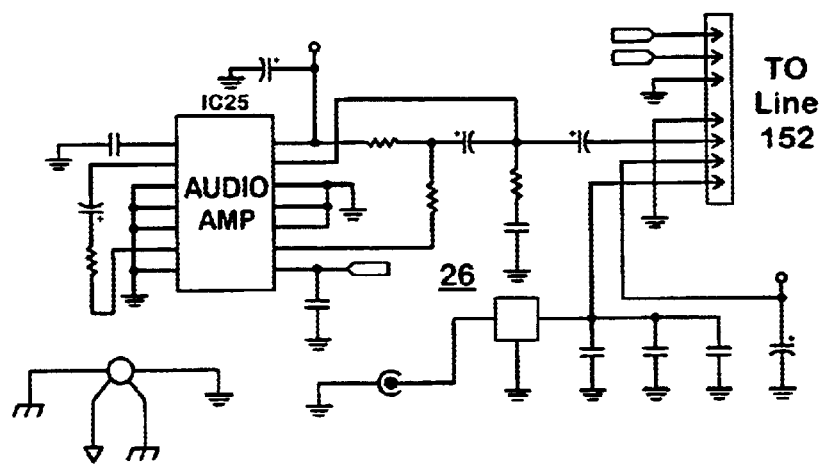

Base unit 26 includes a phone jack J4 which feeds audio to host site phone line manager 26 over line 84, which, in the illustrated embodiment, is a standard analog phone line (FIG. 5*b*). Circuit IC22 is capable of placing the line in an off-hook condition and circuit IC24 is capable of generating touch tone signals. These signals are amplified by transistor Q2 and supplied to the phone line through jack J4. The touch tones are provided both to allow the base unit to call the phone number of the host system. Also, the touch tones are capable of producing DTMF encoded signals in order to allow the host system to verify the authenticity of the call as previously described. Base unit 26 includes an IC17, which is a UART, in order to produce serial signals which are communicated to RS-232 port IC21 to a modem (not shown) connected with line 80 through connector P6. This allows the base unit to exchange data with the host computer 32 in a manner previously described. Base unit 26 further includes an integrated circuit IC25, which is an audio amplifier, which drives speaker 152 through connector P7. The above-described details of host unit 26 are under the control of microcontroller 134. Slave microcontrollers 136 and 144 provide interface to transmitters and receivers in order to coordinate communication with the individual response units 24.

Figure 9:
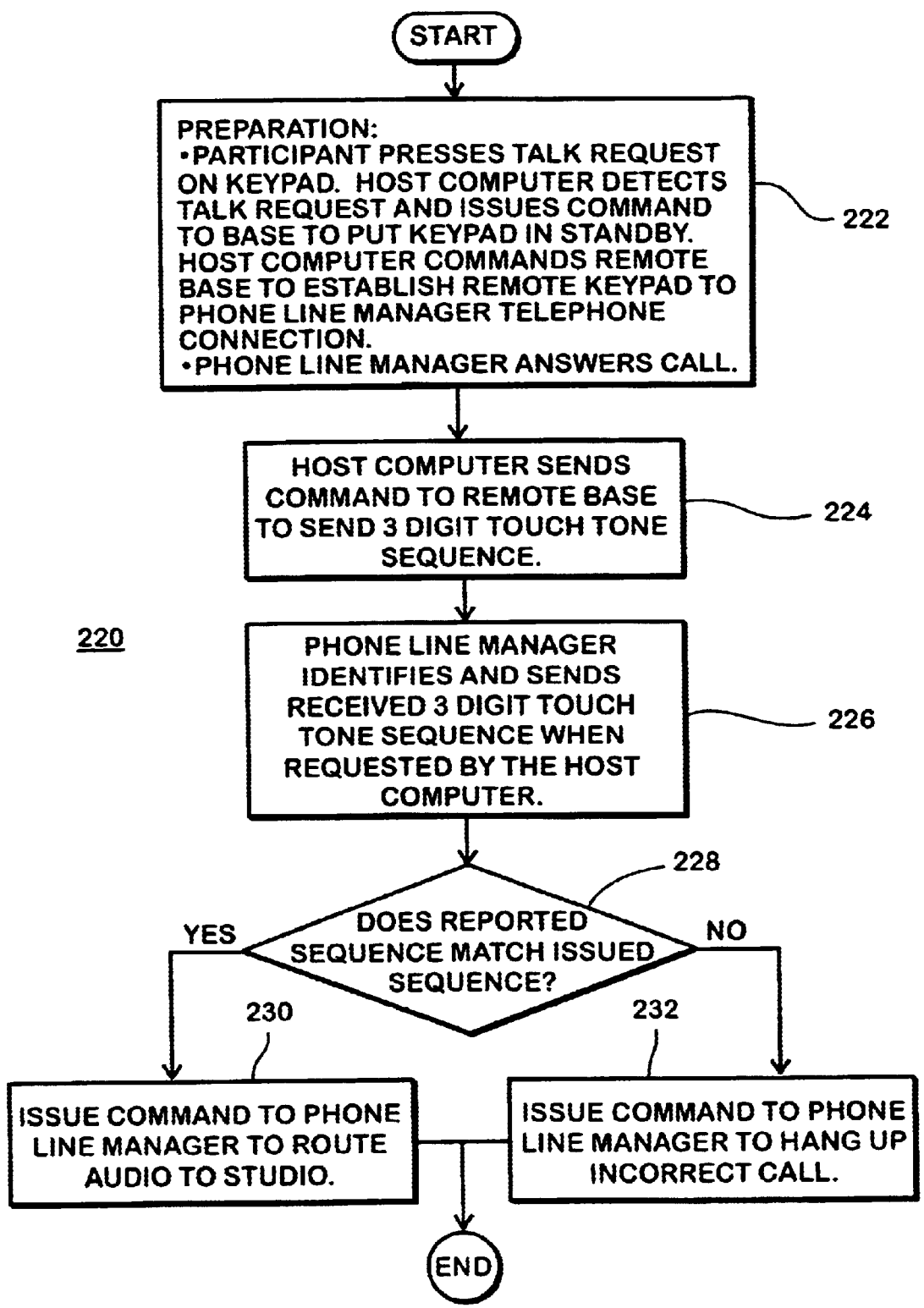
FIG. 9 is a flowchart of a "call validation" function.
Figure 10:
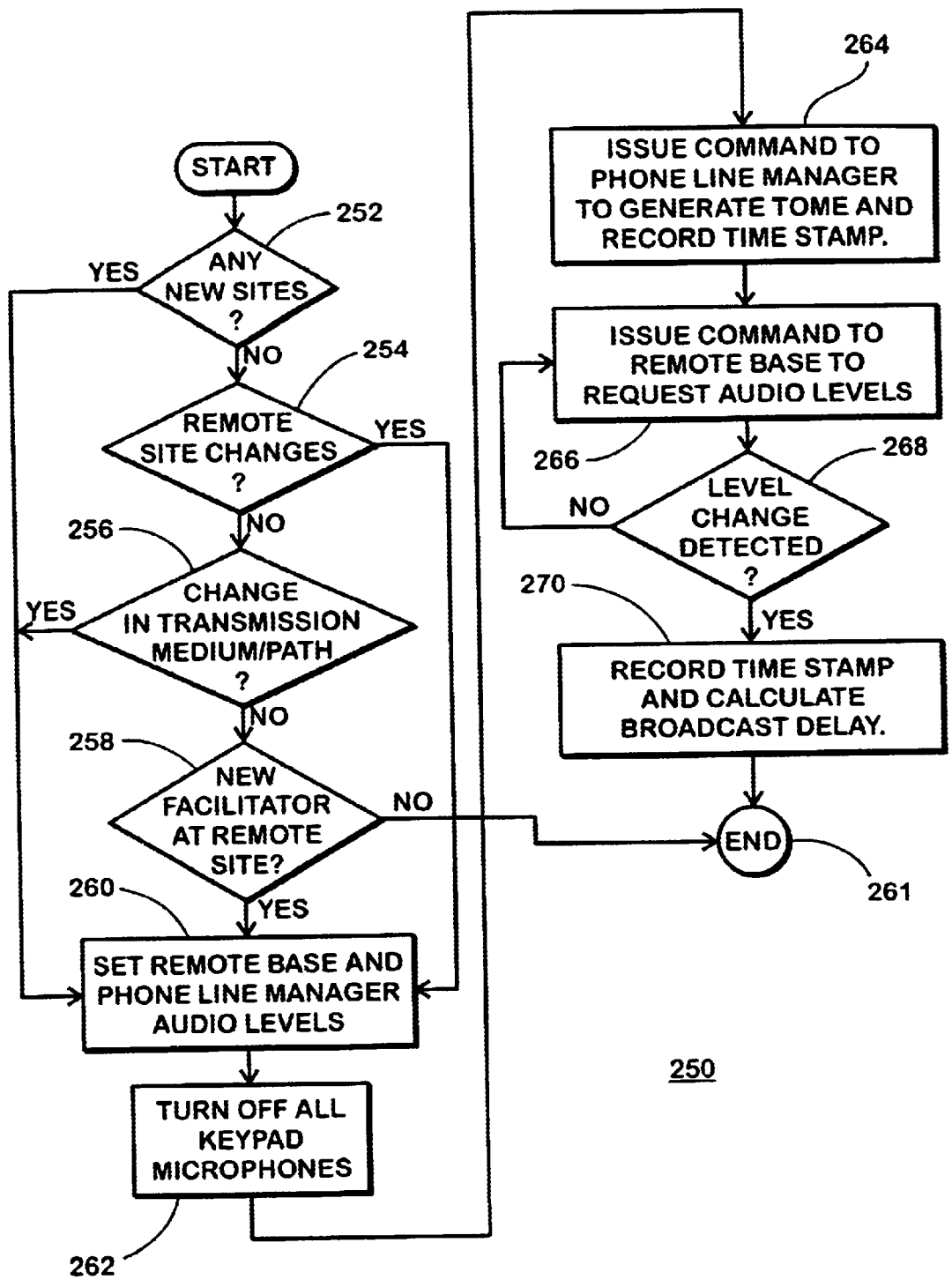
FIG. 10 is a flowchart of an "audio optimization and broadcast delay measurement" function.

A call validation function 220 is initiated at 222 when a respondent presses the "talk request" button on a response unit 24 and base unit 26 sends a command over line 80 to host computer 32 (FIG. 9). Host computer 32 then instructs base unit 26 to place a call to phone line manager 86. Phone line manager 86 answers the ring. Host computer 32 then commands, at 224, the base unit to send three digital touch tone sequences. The phone line manager identifies at 226 the touch tone sequence and forwards the decoded tone to host computer 32 over port 206. Host computer 32 then determines at 228 whether there is a match between the sequence issued and the sequence received. If it is determined at 228 that there is a match, the host computer 32 issues a command at 230 to phone line manager 86 to route the audio to the studio. If it is determined at 228 that there is not a match between the tone sequences, a command is issued at 232 to the phone line manager to hang up the call. In this manner, a phone connection will only be established by the phone line manager if it is properly initiated by a base unit 26. This is intended to eliminate prank calls without the necessity of monitoring by a human at the host site.

Figure 8:
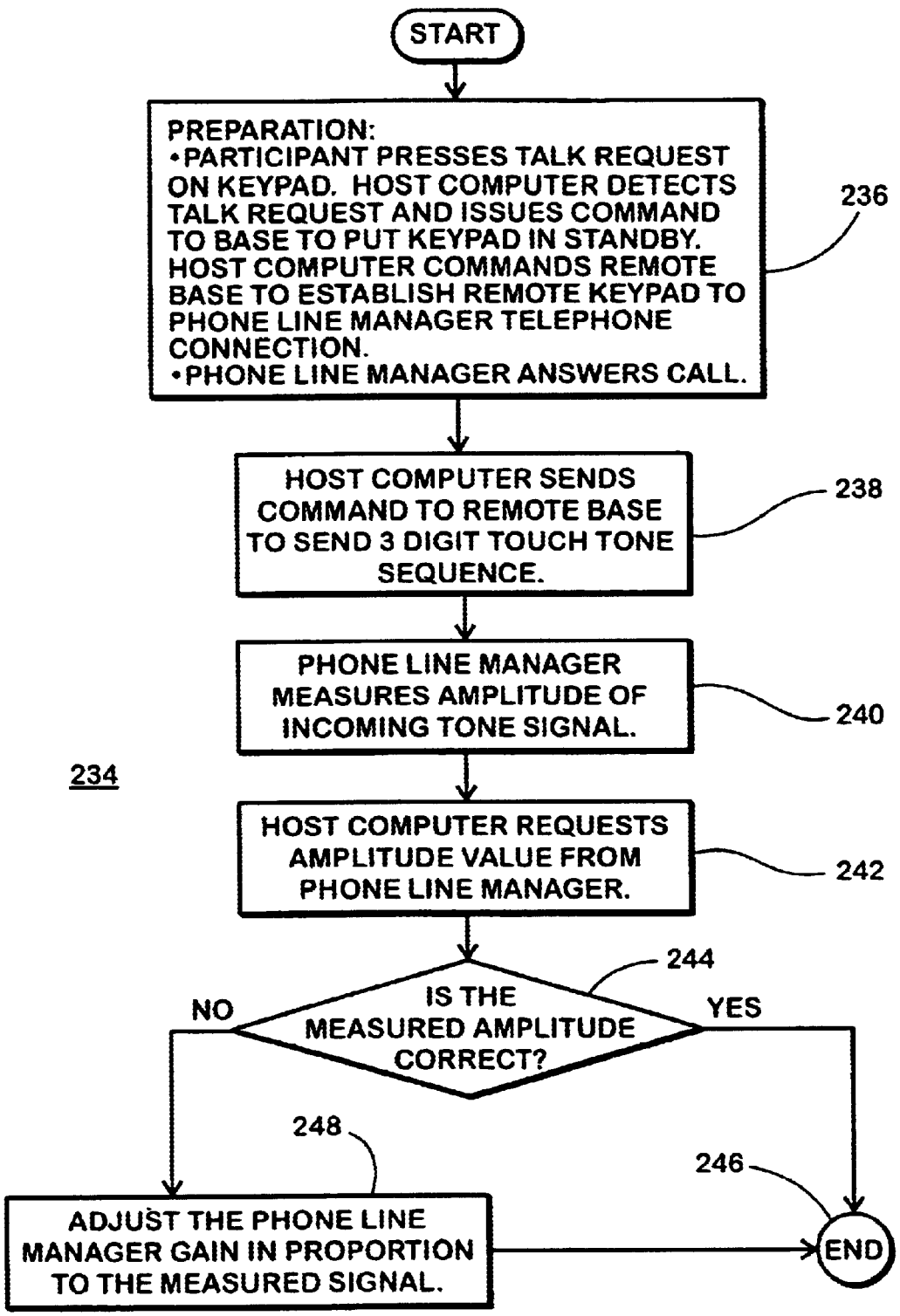
FIG. 8 is a flowchart of an "automatic line-leveling" function.

When the call is placed from the base unit to the host system, an automatic line-leveling function 234 is performed (FIG. 8). The automatic line-leveling function is invoked at 236 when a respondent presses the "talk request" button on the keypad which sends a request to the host computer. The host computer 32 detects the talk request and issues a command to base unit 26 to put the corresponding response unit 24 in a standby mode. Host computer 32 then commands remote base unit 26 to establish the remote keypad connection to phone line manager 86. Phone line manager 86 then answers the call. The host computer 32 sends a command over data line 80 to remote base unit 26 to send a tone at 238. Phone line manager 86 then measures at 240 the amplitude of the tone signal sent at 238. The host computer requests at 242 the amplitude value measured at 240 by phone line manger 86. It is then determined at 244 whether the measured amplitude falls within a predetermined range. If it is determined at 244 that the measured amplitude falls within this range, the function is exited at 246. If it is determined at 244 that the measured amplitude does not fall within the range, then host computer 32 instructs at 248 the phone line manager to adjust its gain to correct any difference from the expected level to the signal measured at 240. The program is then exited at 246. Although the line leveling is performed only at the beginning of a call, it could, if desired, also be invoked during a call if the connection becomes degraded.

It should be clear from a review of the above that the automatic line-leveling function and call-validation function can be combined into a single function in which the call is validated and the line is automatically leveled in the same procedure. However, the functions are preferably performed individually as described.

Whereas the previously described procedures are performed for each incoming call to the host site, an audio optimization and broadcast delay 250 may be conducted upon the setup or modification to a particular remote site 25. The reason is that function 250 is for the purpose of measuring the broadcast delay for VSAT/CATV feed 88. Feed 88, which is, per se, not part of the invention, may extend over one of many various types of communication systems, each building a different delay into the audio-video signal transferred from switch 90 to demodulator 92. Furthermore, video compression/ decompression, when used, is capable of adding significantly to the delay of the signal reaching the remote site. This delay is compensated for by an audio optimization and broadcast measurement function 250, which begins at 252 by determining whether any new remote sites 25 have been added. If it is determined at 252 that there are not any new sites, it is then determined at 254 whether any changes have been made to any remote site which may affect the delay in the audio-video feed. If it is determined at 254 that there were no such changes, then it is determined at 256 whether any changes were made in the transmission media or transmission path to any of the remote sites. If it is determined at 256 that there were no such changes, then it is determined at 258 whether there is a new facilitator at any remote site. If it is determined at 258 that there is not a new facilitator at the remote site, the function is exited at 261. If the determination at 252, 254, 256, or 258 is affirmative, then the routine proceeds to 260 where the remote base unit and phone line manager audio levels are set.

Figure 11:
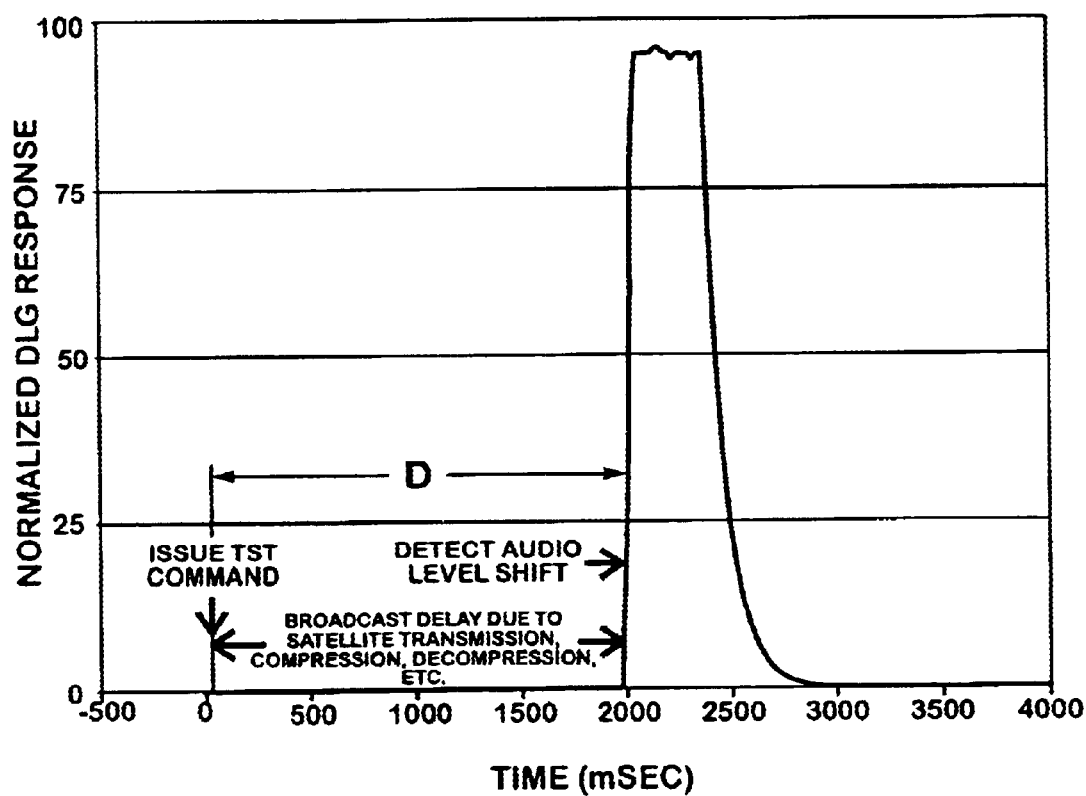
FIG. 11 is a graph illustrating broadcast delay in a remote site interactive response system.

The process proceeds to 262 where the microphones of all response units 24 are turned off by the respective base unit. The host computer 32 then issues a command at 264 to the phone line manager 86 to generate a reference tone and record a time stamp in computer 32. The command is then issued at 266 to the remote base unit to measure the level of the audio signal which was received from the phone line manager. It is then determined at 268 whether the level of the signal detected has changed from the level sent. If there is no change in detected level, then control returns to 266 where the host computer 32 instructs the base unit to again measure the level of the audio signal. This procedure is repeated until it is determined at 268 that there is a measured difference in the detected signal. This is an indication to the host computer that the reference tone was received at the base unit. Control then passes to 270 where host computer 32 compares the time of receipt of the signal from base unit 26 with the recorded time stamp. The broadcast delay can then be calculated by taking the difference between the recorded time stamp of the tone being generated and the recorded time stamp of the signal being received. As can be seen by reference to FIG. 11, the broadcast delay may be, by way of example, 2,000 milliseconds, which is 2 seconds. Once host computer 32 has determined the broadcast delay, it communicates a delay value for the muting of the audio feed 100 at the remote site from which the call is originated to the base unit at that site. That base unit blanks the broadcast audio channel from the instructor upon determining the end of the respondent's audio signal from the microphone of the response unit 24 by the amount of the delay value. This provides proper echo suppression without extending the mute longer than necessary to compensate for the delay.

As noted above with respect to FIG. 7, audio transmitter 47a has two gain levels for transmitting an audio signal received by microphone 46 for that response unit 24. The gain levels allow the microphone to operate in two modes of operation. One mode, called "Far Talk," uses high gain circuitry of audio transmitter 47a to allow the keypad to rest on a table (not shown) in front of the respondent. For example, the "Far Talk" mode of operation would allow the keypads to be permanently mounted to a table such that the respondent does not speak directly into the microphone. A second mode of operation, called "Close Talk," uses a lower gain circuit in audio transmitter 47a. In the "Close Talk" mode of operation, the amplitude of ambient noise, such as other people talking and laughing, is reduced. However, it requires that the microphone be held a matter of inches from the respondent's mouth. The "Far Talk" mode is more likely to result in feedback and to cause blanking of the microphone of the instructor. This failure results from because the background noise, such as laughing, which would be considered by the system to be continued speech by the respondent. Therefore, it is more appropriate that the remote site be in a "Close Talk" mode.

In order to place the host site in either a "Close Talk" mode or a "Far Talk" mode, the host unit 32 issues a command to the base unit 26 prior to start of a session. The host computer issues a "Close Talk" command to place each response unit 24 at the remote site 25 in a "Close Talk" mode. The host unit issues a "Far Talk" command to place the response units 24 at the remote site 25 in a "Far Talk" mode. Thus, control over the mode in which the response units are placed is in the hands of the instructor through the host computer.

Thus, it is seen that it is described herein techniques for enhancing audio performance in a remote interactive system thereby providing audio which is consistent, constant, and useable under varying ambient conditions, which ambient conditions may vary over time. This is accomplished automatically without requiring intervention by the instructor or a system operator and, importantly, does not require the placement of skilled technicians at each remote site.

Although the invention has been described for use with a wireless communication system at the remote site, its principles equally apply to remote sites using hardwired response units, such as described in U.S. Pat. No. 5,303,042.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A remote site interactive system, comprising:
   a host system having an instructor console;
   at least one remote system having a base unit;
   a communication system between said host system and said base unit which is adapted to communicate an instructor audio signal from said host system to said base unit and a respondent audio signal from the base unit to the host system;
   said communication system including an audio enhancer which enhances at least one of said audio signals by regulating at least one chosen from signal level, signal muting and signal source authenticity;
   wherein said audio enhancer sends a reference signal over said communication system from one of said host system and said base unit to at least the other of said host system and said base unit and measures said reference signal at the other of said host system and said base unit; and
   wherein said audio enhancer regulates signal muting by measuring delay of said reference at said other of said host system and said base unit.

2. The remote interactive system in claim 1 including at least one instructor microphone with said host system and at least one respondent microphone with said base unit.

3. The remote interactive system in claim 2 further including a plurality of response units in communicative association with said base unit, each of sail response units for receiving responses from a respondent.

4. The remote interactive system in claim 3 wherein said at least one respondent microphone is joined with at least one of said response units.

5. The remote interactive system in claim 4 wherein said plurality of response units are coupled with said base unit by a wireless communication link.

6. The remote interactive system in claim 3 wherein said plurality of response units are coupled with said base unit by a wireless communication link.

7. The remote interactive system in claim 2 wherein said audio enhancer regulates signal level by said host system having control over sensitivity of said at least one respondent microphone.

8. The remote interactive system in claim 7 wherein said host system has control over sensitivity of said at least one respondent microphone by instructing said base unit to adjust said sensitivity.

9. The remote interactive system in claim 8 wherein said base unit adjusts said sensitivity between a high sensitivity "Far Talk" state useful with the microphone far from the use and a low sensitivity "Close Talk" state useful with the microphone close to the user.

10. The remote interactive system in claim 1 wherein said audio enhancer regulates signal level by measuring level of said reference at said other of said host system and said base unit.

11. The remote interactive system in claim 1 wherein said audio enhancer regulates signal source authenticity by measuring data content of said reference at said other of said host system and said base unit.

12. A remote site interactive system, comprising:
    a host system having an instructor console;
    at least one remote system having a base unit;
    a communication system between said host system and said base unit which is adapted to communicate an instructor audio signal from said host system to said base unit and a respondent audio signal from the base unit to the host system;
    said communication system including an audio enhancer which enhances at least one of said audio signals regulating at least one chosen from signal level, signal muting and signal source authenticity;
    wherein said audio enhancer sends a reference signal over said communication system from one of said host system and said base unit to at least the other of said host system and said base unit and measures said reference signal at the other of said host system and said base unit; and
    wherein said audio enhancer regulates signal source authenticity by measuring data content of said reference at said other of said host system and said base unit.

13. The remote interactive system in claim 12 including at least one instructor microphone with said host system and at least one respondent microphone with said base unit.

14. The remote interactive system in claim 13 further including a plurality of response units in communicative association with said base unit, each of said response units for receiving responses from a respondent.

15. The remote interactive system in claim 14 wherein said at least one respondent microphone is joined with at least one of said response units.

16. The remote interactive system in claim 14 wherein said plurality of response units are coupled with said base unit by a wireless communication link.

17. The remote interactive system in claim 15 wherein said plurality of response units are coupled with said base unit by a wireless communication link.

18. The remote interactive system in claim 13 wherein said audio enhancer regulates signal level by said host system having control over sensitivity of said at least one respondent microphone.

19. The remote interactive system in claim 18 wherein said host system has control over sensitivity of said at least one respondent microphone by instructing said base unit to adjust said sensitivity.

20. The remote interactive system in claim 19 wherein said base unit adjusts said sensitivity between a high sensitivity "Far Talk" state useful with the microphone far from the user and a low sensitivity "Close Talk" state useful with the microphone close to the user.

21. The remote interactive system in claim 12 wherein said audio enhancer regulates signal level by measuring level of said reference at said other of said host system and said base unit.

22. The remote interactive system in claim 12 wherein said audio enhancer regulates signal muting by measuring delay of said reference at said other of said host system and said base unit.

23. An interactive system for providing interaction between an instructor at an instructor location and a plurality of respondents located at at least one geographically separated site, wherein said interactive system is useful with an audio-video transmission system including a studio at the instructor location having audio-video equipment which supplies audio-video information and a communication system which downloads audio-video information from audio-video equipment to an audio-video monitor at the at least one geographically separated site, said interactive system comprising:

a host system having an instructor console and an instructor microphone adapted to be in a studio;

said host system further including a phone line manager adapted to be connected with at least one phone line;

at least one remote system having a base unit old at least one respondent microphone, wherein said base unit is adapted to be connected with at least one phone line;

wherein said host system coordinates with said base unit to measure communication system delay between the studio and an audio-video monitor at the at least one geographically separated site;

wherein said host system generates a time stamp upon sending test signal;

wherein said base unit is adapted to measure the level or the test signal and the gain said base unit applies to an audio portion of the forwarded audio-video information is adjusted as a function of the measured level of the test signal; and wherein said base unit sends level data to said host system of the measured level of the test signal and said host system adjusts gain said base unit applies to the audio portion of the forwarded audio-video information in response to the level data received from the base unit.

24. The interactive system in claim 23 wherein the audio portion of the forwarded audio-video signal is selectively muted by selectively adjusting the gain the base unit applies to the audio portion of the forwarded audio-video signal.

25. The interactive system in claim 23 wherein said host system sends a test signal over the communication system and said base unit receives the test signal.

26. The interactive system in claim 25 wherein said base unit measures receipt of the test signal at said base unit.

27. The interactive system in claim 26 wherein said host system determines when said base unit receives said test signal and thereby measures communication system delay.

28. The interactive system in claim 27 wherein said host system generates a time stamp upon sending the test signal.

29. The interactive system in claim 23 wherein said bass unit is adapted to receive audio-video information from the communication system and to forward the audio-video information to an audio-video monitor.

30. The interactive system in claim 23 wherein the audio portion of the forwarded audio-video signal is selectively muted by selectively adjusting the gain the base unit applies to the audio portion of the forwarded audio-video signal.

31. The interactive system in claim 23 wherein at least one of said host system and said base unit establishes a mute of the audio portion of the audio-video information from the studio to an audio-video monitor at the at remote site as a function of measured communication system delay.

32. The interactive system in claim 31 wherein said base unit establishes tile mute of the audio portion of the audio-video information.

33. The interactive system in claim 23 further including a plurality of response units in communicative association with said base unit, each of said response units is for receiving responses from a respondent.

34. The interactive system in claim 33 wherein said at least one respondent microphone is a plurality of microphones each joined with one of said response units.

35. The interactive system in claim 34 wherein said plurality of response units are coupled with said base unit by a wireless communication link.

36. The interactive system in claim 23 wherein said phone line manager is adapted to be located physically remote from said host system and interconnected with said host system by a communication link.

37. The interactive system in claim 23 further including a plurality of response units in communicative association with said base unit, each of said response units is for receiving responses from a respondent.

38. The interactive system in claim 37 wherein said at least one respondent microphone is a plurality of microphones each joined with one of said response units.

39. The interactive system in claim 38 wherein said plurality of response units are coupled with said base unit by a wireless communication link.

40. An interactive system for providing interaction between an instructor at an instructor location and plurality of respondents located at at least one geographically separated site wherein said interactive system is useful with an audio-video transmission system including a studio at the instructor location having audio-video equipment which supplies audio-video information and a communication system which downloads audio-video information from audio-video equipment to an audio-video monitor at the at least one geographically separated site, said interactive system comprising:

a host system having an instructor console and an instructor microphone adapted to be in a studio;

said host system further including a phone line manager adapted to be connected with at least one phone line;

at least one remote system having a base unit and at least one respondent microphone wherein said base unit is adapted to be connected with at least one phone line;

wherein said host system coordinates with said base unit to measure communication system delay between the studio and an audio-video monitor at the at least one geographically separated site; and wherein at least one of said host system and said base unit establishes a mute of the audio portion of the audio-video information from the studio to an audio-video monitor at the at remote site as a function of measured communication system delay.

41. The interactive system in claim 40 wherein said base unit establishes the mute of the audio portion of the audio-video information.

42. The interactive system in claim 40 wherein said host system sends a test signal over the communication system and said base unit receives the test signal.

43. The interactive system in claim 42 wherein said base unit measures receipt of the test signal at said base unit.

44. The interactive system in claim 43 wherein said host system determines when said base unit receives said test signal and thereby measures communication system delay.

45. The interactive system in claim 44 wherein said host system generates a time stamp upon sending the test signal.

46. The interactive system in claim 42 wherein said host system generates a time stamp upon sending the test signal.

47. The interactive system in claim 46 wherein said base unit is adapted to measure the level of the test signal and the gain said base unit applies to an audio portion of the forwarded audio-video information is adjusted as a function of the measured level of the test signal.

48. The interactive system in claim 47 wherein the audio portion of the forwarded audio-video signal is selectively muted by selectively adjusting the gain the base unit applies to the audio portion of the forwarded audio-video signal.

49. The interactive system in claim 47 wherein said base unit sends level data to said host system of the measured level of the test signal and said host system adjusts gain said base unit applies to the audio portion of the forwarded audio-video information in response to the level data received from the base unit.

50. The interactive system in claim 49 wherein the audio portion of the forwarded audio-video signal is selectively muted by selectively adjusting the gain the base unit applies to the audio portion of the forwarded audio-video signal.

51. The interactive system in claim 40 wherein said base unit is adapted to receive audio-video information from the communication system and to forward the audio-video information to an audio-video monitor.

52. The interactive system in claim 40 wherein said phone line manager is adapted to be located physically remote from said host system and interconnected with said host system by a communication link.

53. In an interactive system for providing interaction between an instructor at an instructor location and a plurality of respondents located at at least one geographically separated site, wherein said interactive system includes a host system at said instructor location and a remote system at said at least one geographically separated site, wherein said host system has an instructor console including an instructor microphone and a phone line manager adapted to be connected with at least one phone line, said interactive system further including a studio at said instructor location having audio-video equipment which supplies audio-video information, said remote system including a base unit and at least one respondent microphone, wherein said base unit is adapted to be connected with at least one phone line, said interactive system further including a communication system which downloads audio-video information from the audio-video equipment at the studio to an audio-video monitor at the at least one geographically separated system, a method of enhancing signal transmission from at least one of said host system and said base unit to at least the other of said host system and said base unit comprising:

sending a test signal from at least one of said host system and said base unit and analyzing the test signal received at the other of said host system and said base unit;

determining a time delay between sending the test signal from the one of said host system and said base unit and receiving the test signal at the other of said host system and said base unit, wherein said time delay is of said communication system; and adjusting muting of said base unit as a function of said delay.

54. The method of claim 53 including sending an encoded test signal from at least one of said host system and said base unit and decoding the encoded signal received at the other of said host system and said base unit in order to determine whether signals received by the other of said host system and said base unit are authentic signals that originate from said at least one of said host system and said base unit.

55. The method of claim 54 including sending the encoded test signal from the base unit to the phone line manager over a phone line.

56. The method of claim 55 including encoding the test signal in response to instructions from the host system sent to the base unit over a data communication channel.

57. The method of claim 53 including analyzing the test signal received at the other of said host system and said base unit to determine a level of the received signal in order to normalize said level.

58. The method of claim 57 including normalizing said level by adjusting the signal at said other of said host system and said base unit.

* * * * *

UNITED STATES PATENT AND TRADEMARK OFFICE
CERTIFICATE OF CORRECTION

PATENT NO.     : 6,665,000 B1
DATED          : December 16, 2003
INVENTOR(S)    : Harry G. Derks and William S. Buehler It is certified that error appears in the above-identified patent and that said Letters Patent is hereby corrected as shown below:

Column 13,
Line 41, "sail" should be -- said --.

Column 14,
Line 15, insert "by" before "regulating".

Column 15,
Line 12, "old" should be -- and --.
Line 20, insert -- the -- after "sending".
Line 21, "or" should be -- of --.
Line 45, "bass" should be -- base --.
Line 59, "tile" should be -- the --.

Column 16,
Line 19, insert -- a -- before "plurality".
Line 21, insert "," after "site".
Line 34, insert -- , -- after "microphone".

Column 18,
Line 4, insert -- , -- after "unit".

Signed and Sealed this

Thirteenth Day of April, 2004

JON W. DUDAS
*Acting Director of the United States Patent and Trademark Office*